(12) United States Patent
Stoner, Jr. et al.

(10) Patent No.: US 11,694,269 B2
(45) Date of Patent: Jul. 4, 2023

(54) CLIMATE DATA PROCESSING AND IMPACT PREDICTION SYSTEMS

(71) Applicants: Entelligent Inc., Boulder, CO (US); SAND Investment Holdings, LLC, Boulder, CO (US)

(72) Inventors: Thomas Stoner, Jr., Boulder, CO (US); Pooja Khosla, Longmont, CO (US); David Schimel, Boulder, CO (US); Mark Labovitz, Superior, CO (US); Elliot Cohen, Boulder, CO (US); Seann Stoner, San Diego, CA (US); Yue Fan, Westminster, CO (US)

(73) Assignees: Entelligent Inc., Boulder, CO (US); SAND Investment Holdings, LLC, Boulder, CO (US)

( * ) Notice: Subject to any disclaimer, the term of this patent is extended or adjusted under 35 U.S.C. 154(b) by 0 days.

(21) Appl. No.: 17/550,421

(22) Filed: Dec. 14, 2021

(65) Prior Publication Data
US 2022/0101441 A1 Mar. 31, 2022

Related U.S. Application Data

(63) Continuation-in-part of application No. 16/582,453, filed on Sep. 25, 2019, now abandoned, which is a
(Continued)

(51) Int. Cl.
*G06Q 40/06* (2012.01)
*G06Q 50/06* (2012.01)
(52) U.S. Cl.
CPC ............ *G06Q 40/06* (2013.01); *G06Q 50/06* (2013.01)
(58) Field of Classification Search
None
See application file for complete search history.

(56) References Cited

U.S. PATENT DOCUMENTS

| 7,464,373 B1 * | 12/2008 | Yunt | G06F 30/20 717/125 |
| 10,038,602 B2 * | 7/2018 | Chen | H04L 41/5077 |

(Continued)

FOREIGN PATENT DOCUMENTS

WO 2014/205496 A1 12/2014

OTHER PUBLICATIONS

International Search Report and Written Opinion dated Nov. 2, 2018 of counterpart International Application No. PCT/US2018/047415.
(Continued)

*Primary Examiner* — William J Jacob
(74) *Attorney, Agent, or Firm* — DLA Piper LLP (US)

(57) ABSTRACT

Systems and methods of assessing climate transition risk. A computing system receives a user indication of a selected climate change scenario from a remote client device. The system identifies one or more energy factors from among energy sources. The system retrieves historical financial information directed to one or more securities from remote financial data sources. The system predicts one or more future returns for the securities, by applying the historical financial data and the energy factors to at least one hierarchical linear model. The system adjusts the predicted future returns based on a first climate scenario and the selected climate scenario, to form respective first and second adjusted returns. The system generates a climate transition risk for the securities based on a spread between the first adjusted returns and the second adjusted returns. The system provides a data set representing the climate transition risk to the remote client device.

27 Claims, 22 Drawing Sheets

Related U.S. Application Data continuation of application No. 16/107,702, filed on Aug. 21, 2018, now Pat. No. 10,521,863.

(60) Provisional application No. 62/548,509, filed on Aug. 22, 2017.

(56) References Cited

U.S. PATENT DOCUMENTS

| | | | |
|---|---|---|---|
| 2009/0043653 A1* | 2/2009 | Sandor | G06Q 40/04 705/14.54 |
| 2009/0138415 A1* | 5/2009 | Lancaster | G06N 5/04 706/11 |
| 2011/0010208 A1* | 1/2011 | Yekutiely | G06Q 10/06 705/7.37 |
| 2011/0016017 A1* | 1/2011 | Carlin | G06Q 10/06 705/26.7 |
| 2011/0106471 A1* | 5/2011 | Curtis | G05B 15/02 702/62 |
| 2011/0208621 A1* | 8/2011 | Feierstein | G06Q 40/04 705/317 |
| 2011/0251933 A1 | 10/2011 | Egnor et al. | |
| 2012/0166616 A1* | 6/2012 | Meehan | G06Q 50/06 709/224 |
| 2012/0316916 A1 | 12/2012 | Andrews et al. | |
| 2013/0231906 A1* | 9/2013 | Luvalle | G06N 7/00 703/2 |
| 2013/0262341 A1* | 10/2013 | Bourne | G06Q 40/12 705/36 R |
| 2014/0278165 A1* | 9/2014 | Wenzel | G06Q 50/08 702/183 |
| 2014/0278294 A1* | 9/2014 | Yeager | G06F 30/20 703/22 |
| 2015/0371151 A1 | 12/2015 | Georgescu et al. | |
| 2016/0117774 A1* | 4/2016 | Bateman | G06Q 40/06 705/36 R |
| 2016/0196513 A1* | 7/2016 | Mallon | G06F 11/3409 705/7.28 |
| 2016/0328723 A1* | 11/2016 | Cunnane | G06Q 30/0201 |
| 2017/0161859 A1* | 6/2017 | Baumgartner | G06Q 50/26 |
| 2017/0176640 A1* | 6/2017 | Kodra | G01W 1/10 |
| 2019/0066217 A1 | 2/2019 | Stoner, Jr. et al. | |

OTHER PUBLICATIONS

Entelligent: Entelligent's Smart Climate Portfolio Optimizer, Smart Climate Data Solutions, Entelligent, Sep. 28, 2016, [retrieved on Oct. 12, 2018], Retrieved from the internet: <URL: https://d3n8a8pro7vhmx.cloudfront.net/intentionalendowments/pages/1413/attachments/original/1480968842/Entelligent_Exec_WP.pdf?148096.8842> pp. 1-8.

MSCI ESG Ratings, More Data, More Context, More Informed Decisions, Providing Institutional Investors with a More Robust ESG Integration Took to Help Them Mitigate Risk and Enhance Long Term Value Creation, 2018, MSCI, Inc., https://www.msci.com/documents/1296102/1636401/MSCI+ESG+Rating+Brochure-V3.pdf/f2b4a27a-58f5-42c7-880b-cf8201039eaa.

"ESG Data," Bloomberg, Impact Report, 2018, Bloomberg Finance L.P., https://www.bloomberg.com/impact/impact/esg-data/.

"S-Ray, Explore the Sustainability of the World's Biggest Companies," 2017, Arabesque, https://arabesque.com/s-ray/.

"CSRHUB, Sustainability Management Tools, About CSRHub," 2018, CSRHUB, https://esg.csrhub.com/about-csrhub.

"En-ROADS Energy—Rapid Overview and Decision-Support Simulator," ClimateInteractive, https://www.climateinteractive.org/wp-content/uploads/2013/12/enroads2pager.pdf.

International Preliminary Report on Patentability and Written Opinion dated Mar. 5, 2020 in counterpart PCT Application No. PCT/US2018/047415.

Technical Supplement, "The Use of Scenario Analysis in Disclosure of Climate-Related Risks and Opportunities," Task Force on Climate-Related Financial Disclosures (TCFD), Dec. 14, 2016, 34 pages.

Blackrock, 2 Degrees Investing Initiative, "To What Degree? A Climate Scenario Analysis of U.S. Insurer's Portfolios," 2019, 23 pages.

Supplementary European Search Report dated Mar. 23, 2020 in counterpart European Application No. 18849230.0.

Woltman, Heather et al., "An Introduction to Hierarchical Linear Modeling," Tutorials in Quantitative Methods for Psychology, 2012, vol. 8(1), pp. 52-69.

European Search Report dated Feb. 3, 2023, of counterpart European Application No. 22211065.2.

European Official Action dated May 19, 2023, of counterpart European Application No. 18 849 230.0.

\* cited by examiner

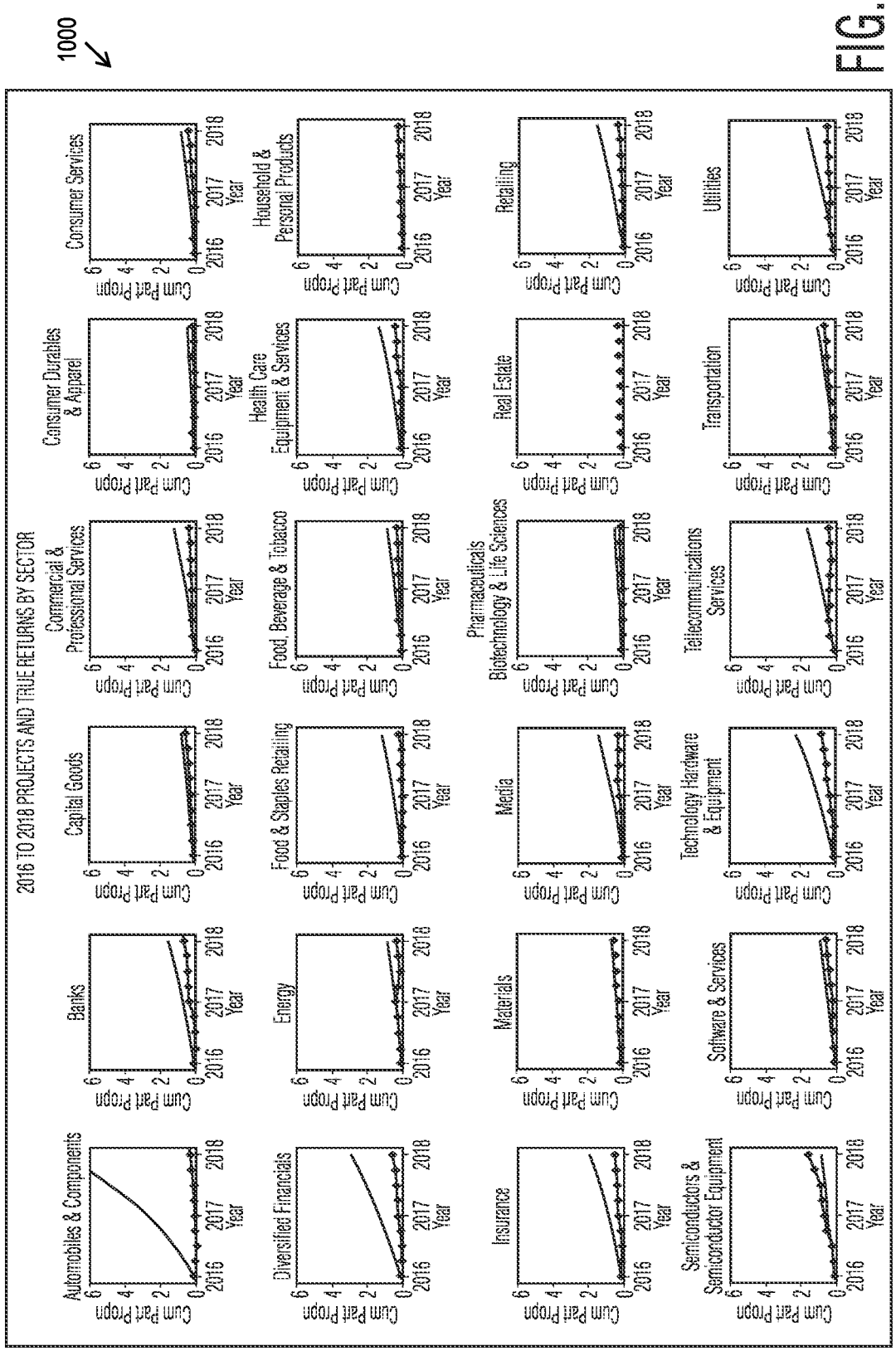

CLIMATE DATA PROCESSING AND IMPACT PREDICTION SYSTEMS

TECHNICAL FIELD

The present disclosure relates to systems and methods for climate data processing and impact prediction, including, for example, financial impact and performance prediction, and more specifically to assessing climate change risk at a security level.

BACKGROUND

Uncertainty and unpredictability within environmental phenomenon, social phenomenon, and governance standards makes it difficult to understand their emerging trends, as well as the impact that the trends may have upon investments.

Nevertheless, there is a recent movement towards environmental, social, and governance standards (ESG) investing; investing that focuses on environmental, social and governance standards used by socially responsible investors in screening investments. An environmental aspect examines a company's performance regarding the environment. A social aspect examines a company's products and services and relationships with employees, customers and the community. A governance aspect examines a company's leadership, internal controls and shareholder rights. The recent movement and growth towards ESG investing is evidenced by the increase in the subsection of ESG focused exchange traded funds (ETFs).

Despite the interest in ESG investing, much of the data used to make decisions based on environmental, social and governance standards of a company is unreliable, as it is self-reported, and often non-quantifiable. For example, hundreds of firms are dedicated to analyzing and rating company ESG performance. However it is unclear what mechanism the firms utilize to analyze and rate company ESG performance. Furthermore, a majority of the ESG data used by firms is binary (yes/no) answers to questions related to corporate policies. The ESG data is compiled from self-reported information and so there is a lack of quantifiable metrics and the ability to compare between different companies. Accordingly, there exists a need for quantifiable metrics related to ESG investing.

Moreover, the environmental aspect of ESG investing has added uncertainty and unpredictability due to a changing climate. The impacts of climate change are far reaching and vast. Climate change has been associated with a rise in global sea levels, melting ice, thermal expansion (the warming of ocean water). Additionally, the rise in global sea levels, increase in melting ice and thermal expansion may interact with cyclical phenomenon such as El Niño and La Niña, thus compounding the volatility of local environment and global climate. Climate change creates new uncertainties for investors as rising global temperatures and sea levels may make weather patterns more difficult to predict. Additionally the global regulatory response to climate change adds uncertainty to the performance of investments. Moreover climate change may also increase the risk of modeling error to account for extreme weather risks. Accordingly, there remains a need for a way to better process climate data to understand climate phenomenon and the impact of climate phenomenon on investments.

Additionally, the changing environmental conditions contribute to stock market volatility as the changing environmental conditions may impact, for example, the oil prices that are central to the stock market. Accordingly there is a need for realistic valuations of both energy and non-energy companies in view of a changing climate and local environment and providing a quantitative evaluation of companies most likely to benefit or suffer from climate change. There is a need for systems and methods that are able to relate climate data to economic data and quantifiably measure the impact of climate change on economic investment.

SUMMARY

Embodiments disclosed herein generally relate to a system, method, and non-transitory computer readable medium for assessing climate change risk at a security level. A computing system receives a selection of a climate change scenario from a user operating a remote client device. The computing system generates one or more environmental metrics for one or more energy sources based on the climate change scenario selected by the user. The computing system converts the one or more environmental metrics for the one or more energy sources into one or more profitability indicators. The computing system retrieves one or more sets of financial information directed to one or more securities from one or more remote financial data sources. The computing system correlates at least one energy source of the one or more energy sources to each security of the one or more securities, by downward deploying the one or more profitability indicators of the one or more energy sources to the one or more sets of financial information of each security. The computing system generates a projected climate change risk for each security of the one or more securities based on the one or more environmental metrics for the one or more energy sources. The computing system provides a data set representing the projected climate change risk to the remote client device.

In one embodiment, the system may generate public equity indices and portfolio analysis tools. In one embodiment, the generated public equity indices may be benchmarked to one or more public indices such as the S&P 500 or the Russell 1000. In one embodiment, the system may uniquely leverage machine learning to neutralize climate change risk and integrate energy economics and financial analysis to optimize portfolio performance.

In one embodiment, the system may focus on impacts of climate change on equity portfolios using machine learning and artificial intelligence to model climate change related risks. The system may assist in determining changes in future energy subsector investments all the while considering capital expenditures, cost of infrastructure investments, and carbon emissions.

In one embodiment, the system may forecast the global usage and prices of various energy sources including for example, oil, coal, renewables (including, for example, solar and wind), nuclear, natural gas, and the like. The system may then analyze the effect of the global usage and prices of energy sources on the profitability of all industries and individual companies within the industry. In one embodiment, the predicted energy source behavior and profitability of industries and individual companies may be used to optimize portfolios for climate risk.

In one embodiment, the system may utilize a climate model, a global energy model and a dynamic system of equations. The exemplary system may allow multiple scenario generation and testing capacity, flexibility to generate customizable scenarios, the ability to align portfolios to low carbon scenarios, forecasted energy usage by type and price, adjustments for technology advancements and breakthroughs, aggregate level scenario sensitivities (by subsector and region), may calculate scenario sensitivities at individual security levels, and may provide the ability to optimize any broad-based market index.

Embodiments disclosed herein also relate to a system, method, and non-transitory computer readable medium for assessing climate transition risk of one or more securities. A system includes a processor and a memory having programming instructions stored thereon, which, when executed by the processor, causes the processor to perform an operation. The operation includes receiving, via at least one network, a user indication of a selected climate change scenario from a remote client device; identifying one or more energy factors from among one or more energy sources; and retrieving, over the at least one network, historical financial information directed to one or more securities from one or more remote financial data sources. The operation further includes predicting one or more future returns for the one or more securities, by applying the historical financial data and the one or more energy factors to at least one hierarchical linear model (HLM). The operation further includes adjusting the predicted one or more future returns based on a first climate scenario and the selected climate scenario, to form respective first adjusted returns and second adjusted returns. The operation further includes generating a climate transition risk for the one or more securities based on a spread between the first adjusted returns and the second adjusted returns. The operation further includes providing a data set representing the climate transition risk to the remote client device.

BRIEF DESCRIPTION OF THE DRAWINGS

Many aspects of the present embodiments may be better understood with reference to the following drawings. The components in the drawings are not necessarily to scale, emphasis instead being placed upon illustrating example embodiments:

FIG. 10 is a screen shot illustrating an example graphical user interface, according to one exemplary embodiment.

DETAILED DESCRIPTION

Figure 1:
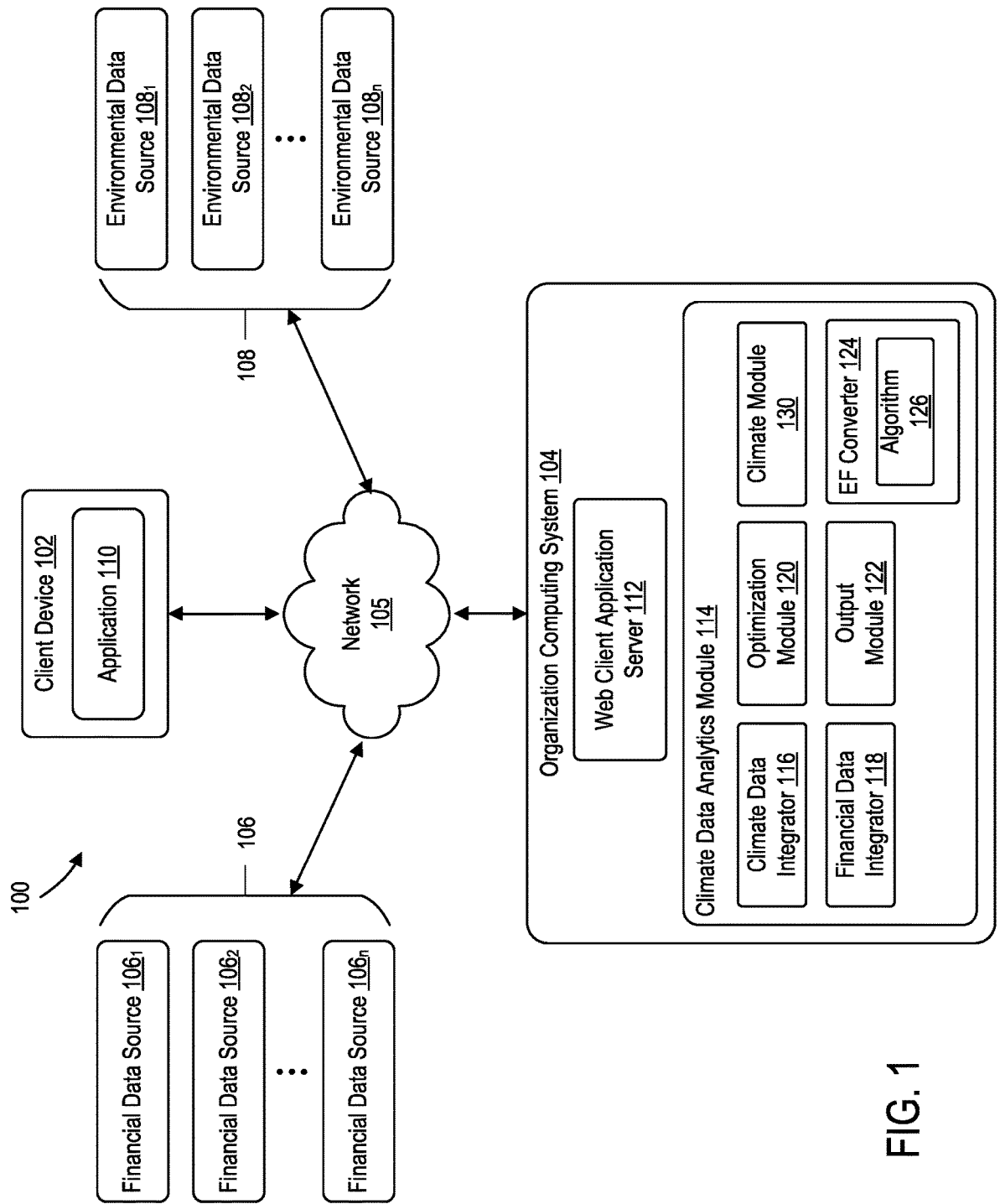
FIG. 1 is a functional block diagram illustrating a computing environment for climate data processing and impact predication, according to one exemplary embodiment.

As discussed above, the impacts of climate change may alter the behavior of energy sources and impact the profitability of industries and individual companies. Thus, in order to allocate investments within investment portfolios that mitigate for the short-term and long-term impacts of climate change, it is beneficial to quantitatively understand the impact of temperature changes, greenhouse gas emissions, and carbon emissions on investments.

One or more techniques disclosed herein generally relate to a system and method of climate data processing and impact prediction, including, for example, financial impact and performance prediction. More specifically, the one or more techniques disclosed herein use climate data processing and impact prediction to assess climate change risk at a security level. Conventional approaches to climate data processing and impact predicting rely on a "bottom-up" approach. In other words, conventional approaches begin at a company (or security) level, and rely on self-reported information to perform data processing. These conventional techniques typically result in a lack of quantifiable metrics and an inability to compare climate data processing and impact prediction across two or more companies.

The systems and techniques of the present disclosure eliminates the conventional "bottom-up" approach. Instead, systems/techniques of the present disclosure implement a "top-down" approach. The "top-down" approach includes the downward correlation between one or more energy sources and one or more companies. In particular, the one or more techniques discussed herein begin at an energy source level, by treating each energy source as its own entity. Climate data may then be generated for each energy source based on one or more scenarios selected by an end user. The claimed system then converts the generated climate data for each energy source into one or more profitability indicators. The climate data to financial data conversion allows the system to downward correlate each energy source to a respective industry subsector, by using historical price returns of each industry subsector. Within each industry subsector, the present system can identify one or more companies to which each energy source maps. From this information, the present system is able to predict future returns for each company and use the predicted future returns to assess climate change risk for the company. In other words, the downward correlation or downward deployment may be thought of as a translating of profitability and risk signals associated with each energy source (a first level) to one or more securities and portfolios (a second level).

In some embodiments, climate data may be generated for one or more policies and/or scenarios specified by a user. For example, climate data may be generated for each specific policy, socio-economic scenario, and/or macro-economic scenario specified by the user. For each policy/scenario, an energy mix may be determined. From the energy mix, the system may generate one or more metrics, such as, but not limited to, energy supply, energy demand, energy prices, energy costs, and the like. The one or more metrics may be used for further interpolation of the financial data/profitability indicators at an energy source level.

Accordingly, the one or more techniques discussed herein eliminates any dependency on companies to self-report or provide ESG information.

Additionally, such evaluation of climate risk assessment based on global climate inputs performed using the one or more techniques disclosed herein improves upon conventional systems, by providing a climate forecast based on profitability indicators under one or more scenarios selectable by an end user. Such assessment may provide investors with valuable information, such as the climate risk associated with such investment, under various scenarios. Such an evaluation of climate risk assessment, contrary to conventional systems and techniques, is predictive (i.e., forward-looking), is able to provide end users (e.g., investors) risk information that a security (or an investment) may be susceptible to climate change over time, and according to a determination that is based on exposure to one or more energy sources (as opposed to at a company level-via the bottom up approach).

FIG. 1 is a functional block diagram illustrating a computing environment 100, according to one exemplary embodiment. As illustrated, computing environment 100 includes at least one client device 102, an organization computing system 104, one or more financial data sources 106$_1$, 106$_2$, and 106$_n$ (generally "data sources 106"), and one or more environmental data sources 108$_1$, 108$_2$, and 108$_n$ communicating via network 105.

Network 105 may be of any suitable type, including individual connections via the Internet such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include the Internet, a private data network, virtual private network using a public network and/or other suitable connection(s) that enables components in computing environment 100 to send and receive information between the components of environment 100. Although one network 105 is illustrated in FIG. 1, it is understood that network 105 may include one or more interconnected networks.

Client device 102 may be operated by a user (or customer). For example, client device 102 may be representative of a mobile device, a tablet, a desktop computer, workstation or any computing device or computing system having the capabilities described herein. Client device 102 may include at least application 110. Application 110 may be representative, for example, of a web browser that allows access to a website or a stand-alone application. Client device 102 may access application 110 to access one or more functionalities of organization computing system 104.

Client device 102 may communicate over network 105 to request a webpage, for example, from web client application server 112 of organization computing system 104. For example, client device 102 may be configured to execute application 110 to access content managed by web client application server 112. The content that is displayed to client device 102 may be transmitted from web client application server 112 to client device 102, and subsequently processed by application 110 for display through a graphical user interface (GUI) generated (or rendered) by client device 102.

Organization computing system 104 may include at least web client application server 112 and climate data analytics module 114. Climate data analytics module 114 may be configured to predict the performance of one or more companies based on a predicted environmental state. Climate data analytics module 114 may include climate data integrator 116, a financial data integrator 118, optimization module 120, output module 122, environmental-to-financial (EF) converter 124, and climate module 130.

Each of climate data integrator 116, a financial data integrator 118, an optimization module 120, an optimization module 122, an environmental-to-financial (EF) converter 124, and climate module 130 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code a processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Climate data integrator 116 may be configured to receive climate related data from one or more environmental data sources 108. As illustrated, organization computing system 104 may be in communication with one or more environmental data sources 108.

One or more environmental data sources 108 may be representative of one or more computer systems hosting environmental data. Such environmental data sources 108 may include, but are not limited to governmental and international organizations and their databases such as the United States Energy Information Administration (US EIA), the International Monetary Fund's World Economic Outlook (IMF WEO), the US Department of Energy (DOE), the United Nations (UN), the International Energy Agency (IEA), and the National Air and Space Administration's Goddard Institute for Space Studies (NASA GISS).

In some embodiments, one or more environmental data sources 108 may further include academic and research institutes such as the Massachusetts Institute of Technology (MIT). Academic and research institutes may provide climate or financial related databases and models such as MIT's Emissions Prediction and Policy Analysis model (MIT EPPA). Climate data integrator 116 may retrieve from one or more environmental data sources 108 climate or environmental data such as atmospheric carbon dioxide levels, global surface temperatures, gross domestic product (GDP), population, energy intensity of GDP, carbon intensity of energy, carbon dioxide emissions from energy, measures of the effect of technological progress on energy, measures of the effect of energy price on energy intensity, cost by electrical source, electrical generation by energy source, and fraction of revenue put into process research and development by energy source.

In some embodiments, one or more environmental data sources 108 may include sources of corporate social responsibility (CSR) ratings or other environmental, governance, political, geographic, and social metrics. Other data may include financial and other security level data from FACTSET®. In some embodiments, other data may include regulatory reports filed to the Securities and Exchange Commission (SEC), company disclosures through press releases, corporate sustainability reports, industry specific information such as Integrated Resource Plans filed by electric utilities, analyst reports, self-reported climate disclosure reports and other commercial and non-profit sources of information.

In some embodiments, one or more environmental data sources 108 may further includes the carbon dioxide information analysis center (CDIAC) of the National Climatic Data Center (NCDC), the National Ocean and Atmospheric Administration (NOAA) and the International Panel on Climate Change (IPCC). In one embodiment, data related to selected features may be extracted from the climate related data at climate data integrator 116. Selected features may include one or more of the projected gross domestic product (GDP) level, carbon tax, and the subsidy on renewables.

Climate data integrator 116 may be configured to aggregate and process the environmental and/or climate information received from one or more environmental data sources 108.

Financial data integrator 118 may configured to retrieve financial data from one or more financial data sources 106. As illustrated, organization computing system 104 may be in communication with one or more financial data sources 106.

One or more financial data sources 106 may be representative of one or more computer systems hosting environmental data. Such environmental data sources 106 may include, but are not limited to, stock exchanges, academic journals and the like. Data retrieved may also include economic data such as gross domestic product (GDP), interest rates, data on taxes and subsidies, energy prices, and carbon prices.

In some embodiments, such financial data sources 106 may further include data on the return and performance of securities such as FACTSET®. In some embodiments, financial data integrator 118 may collect data on companies listed on major stock exchanges such as the New York Stock Exchange (NYSE), NASDAQ, the Toronto Stock Exchange (TSX), the Toronto Stock Exchange-Venture (TSX-V), the London Stock Exchange (LSE), the Stock Exchange of Hong Kong (SEHK), and the Australian Securities Exchange (ASX). Financial data integrator 118 may be configured to determine returns for each of the constituents along with the mean returns for all constituents.

In one embodiment, financial data sources 106 may collect data regarding the constituents of an index. In one embodiment, the impact of climate change on investments may be determined and recalculated on a quarterly basis, although any suitable time period may be used. The constituents of the index may differ for each recalculation. The financial data may include data spanning a number of months or years. In one embodiment, the financial data may include historical returns for securities for at least eight historical years. In one embodiment, securities with limited data (e.g., securities with less than six months of data) may be excluded. In one embodiment, securities demonstrating un-realistic returns may be excluded.

Climate module 130 may be configured to receive climate data from climate data integrator 116. In some embodiments, climate module 130 may simulate the future price, supply, and demand for energy sources using data received from climate data integrator 116. Such energy sources may include oil, gas, coal, biofuels, renewable fuel, renewable electric, hydro, new technology and nuclear. In some embodiments, climate module 130 may take as input from, for example, client device 102, a scenario upon which to base the analysis. Accordingly, climate module 130 is configured to project climate data for each energy source based on the selected scenario.

EF converter 124 may be configured to receive output from climate module 130, and convert the output received from climate module 130 into one or more profitability indicators. In other words, EF converter 124 may be configured to convert climate related metrics into financial related metrics. By converting climate related metrics for each energy source into financial related metrics, climate data analytics module 114 may generate one or more indicators for each energy source as if each energy source represents a company or business subsector.

EF converter 124 may use the simulations of the future price and demand for energy sources produced by the climate module 130 to generate a profitability estimate. In some embodiments, the profitability estimation is based on one or more algorithms 126 (e.g., a system of difference equations). The profitability simulations executed by EF converter 124 may generate financial time series values such as net present value (NPV), return on investment (ROI), debt coverage ratio (DCR), and internal rate of return (IRR) for each of the one or more energy sources. The financial time series values may be based on an estimate of the total revenue of energy sources and the total cost of investment in energy sources.

In some embodiments, the total revenue of energy sources may be based upon energy demand and price that accounts for macro-economic indicators such as GDP, population, average overall cost of supply, energy supply capital lifetime and discount rate percentage, climate change indicators such as temperature, sea level estimates, amount of greenhouse gas emissions (GHG), and water consumption, as well as policy indicators such as carbon price, subsidies and GDP, population, interest rates, capital efficiency.

Optimization module 120 may generate company level predictions by downward deployment of the profitability indicators generated for each energy source to a security level data. In other words, optimization module 120 may correlate each energy source with one or more business subsectors based on the profitability indicators generated by EF converter 124. In some embodiments, optimization module 120 may identify the most correlated energy sources under one or more scenarios (e.g., a business as usual scenario, a carbon emission scenario, etc.) for each security.

In some embodiments, after optimization module 120 identifies the industry subsectors correlated to each energy source, optimization module 120 may downward deploy the information another level, by correlating companies within each subsector to a particular energy source. Such company level correlations may be made based on, for example, comparative positioning of companies within the industry subsector. Companies may be comparatively positioned within an industry subsector based on, for example, their size, growth, and/or volatility within the subsector. In one embodiment, optimization module 120 may utilize statistical models such as, but not limited to Monte-Carlo simulations, to test the identified industry subsector's most correlated energy categories (discussed further below).

In some embodiments, once optimization module 120 correlates each energy source to a business subsector, optimization module 120 may be configured to project environmental performance of the business subsector, based on the related climate data of the correlated energy source generated by climate module 130.

Output module 122 may be configured to provide a scoring based, for example, on a company's exposure to the energy industry and climate change using environmental, social and governance (ESG) metrics and the results from the optimization module 120. The scoring may provide a quantitative and objective means for comparing the performance of different companies in accordance with ESG standards.

In some embodiments, output module 122 may produce a website, accessible by one or more users via application 110 executing on client device 102. The website may provide a dashboard that allows users to view results generated by climate module 130, EF converter 124, and/or optimization module 120. In some embodiments, output module 122 may generate one or more data files for electronic transfer to client device 102. EF converter 124 may provide the output produced by output module 102 to one or more client devices 102. In some embodiments, the results from the optimization module 120 may be used to project portfolio performance relative to multiple emission scenarios, optimize a portfolio based on selected scenarios, and climate and energy risk parameters associated with the selected scenarios.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Those skilled in the art will appreciate that organization computing system 104 may be configured with more or less modules to conduct the methods described herein with reference to FIGS. 2-6. As illustrated in FIGS. 2-6, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 2-6 may be performed by one or more specialized processing components associated with components 112-130 of organization computing system 104 of FIG. 1.

Figure 2:
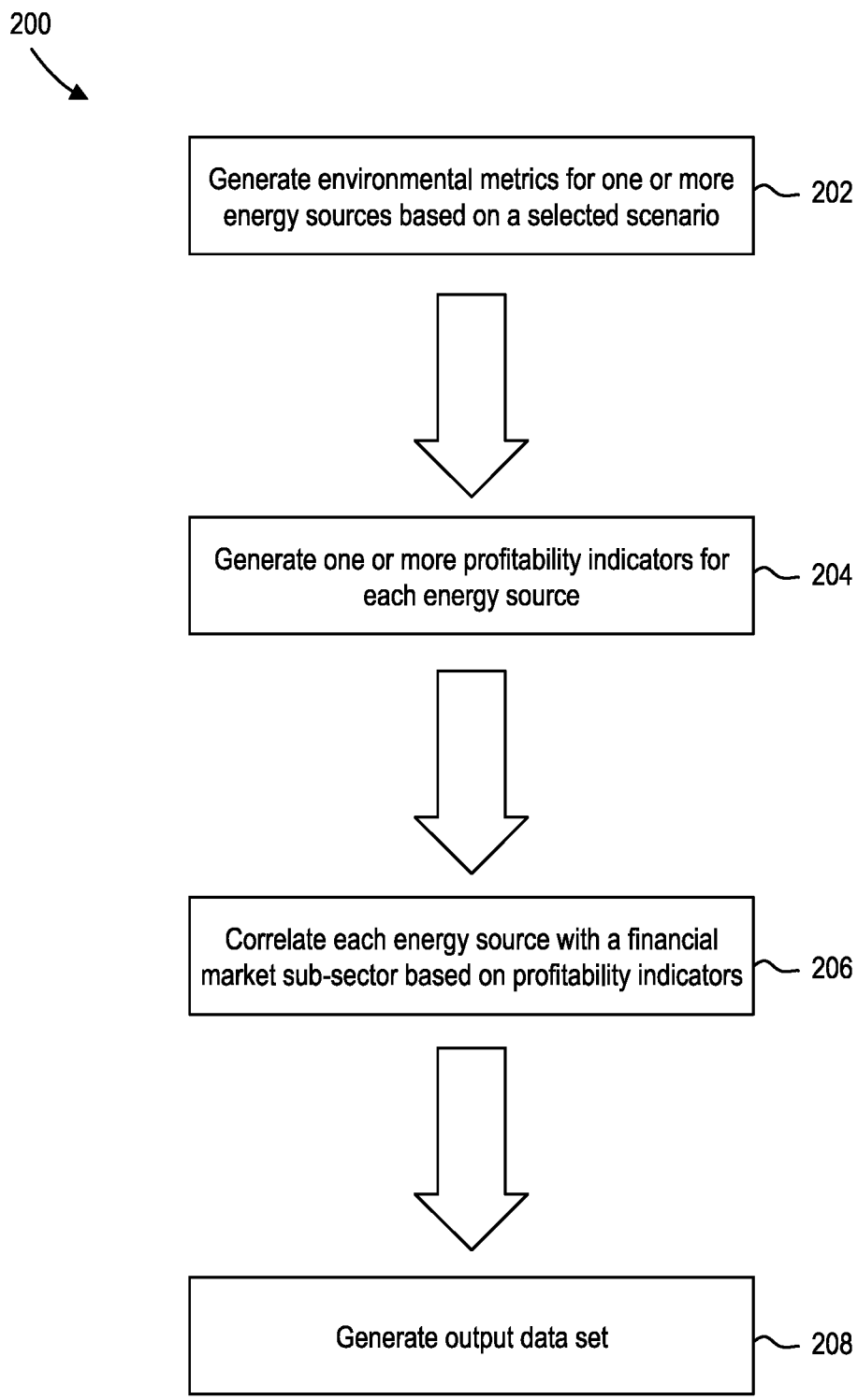
FIG. 2 is a flow diagram illustrating a method of climate data processing and impact prediction, according to one exemplary embodiment.

FIG. 2 is a flow diagram illustrating a method 200 of climate data processing and impact prediction, according to one exemplary embodiment. As illustrated, method 200 may have four phases.

At phase 202, climate data analytics module 114 may generate one or more environmental metrics for one or more energy sources based on a selected scenario. The one or more operations implemented at phase 202 are discussed in further detail below, in conjunction with FIG. 3.

At phase 204, climate data analytics module 114 may generate one or more profitability indicators for each of the one or more energy sources. For example, climate data analytics module 114 may generate the one or more profitability indicators based on the one or more environmental metrics generated during phase 202. The one or more operations implemented at phase 204 are discussed in further detail below, in conjunction with FIG. 4.

At phase 206, climate data analytics module 114 may correlate each energy source with a financial subsector based on the one or more profitability indicators. For example, climate data analytics module 114 may downward deploy the profitability indicators generated in phase 204 to one or more financial subsectors down to one or more companies within each financial subsector. The one or more operations implemented during phase 206 are discussed in further detail below, in conjunction with FIG. 5.

At phase 208, climate data analytics module 114 may generate an output data set for a user. For example, climate data analytics module 114 may provide a scoring based on a company's exposure to the energy industry and climate change using environmental and social and governance (ESG) metrics. The one or more operations implemented during phase 208 are discussed in further detail below, in conjunction with FIG. 6.

Figure 3:
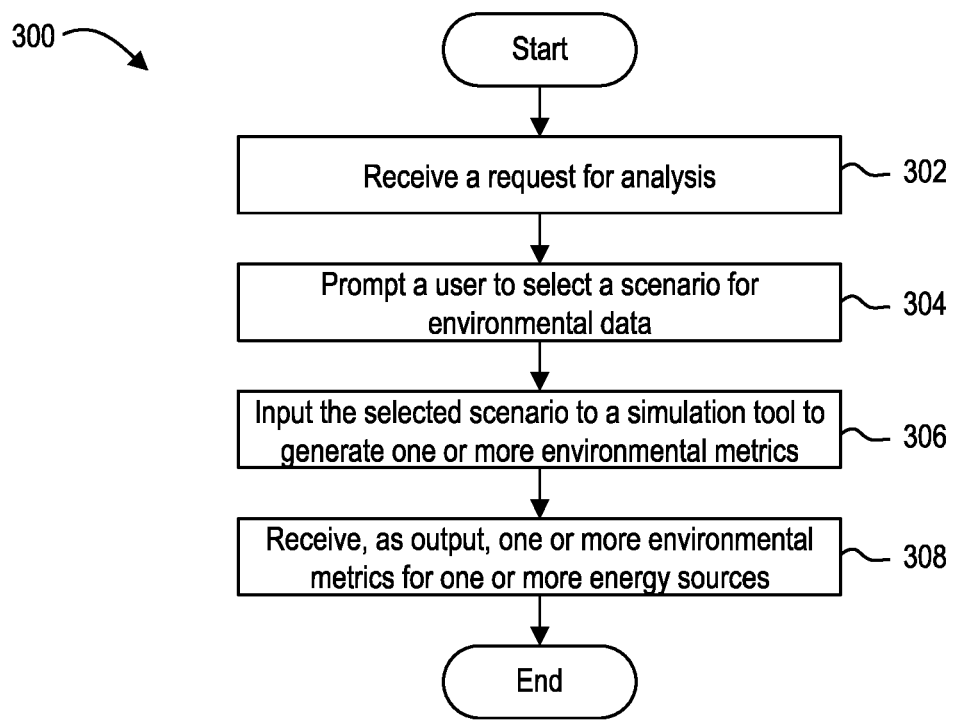
FIG. 3 is a flow diagram illustrating a method of one or more operations included in a first phase of the method discussed in FIG. 2, according to one exemplary embodiment.

FIG. 3 is a flow diagram illustrating a method 300 of operation during phase 202, according to one exemplary embodiment. Method 300 may begin at step 302.

At step 302, organization computing system 104 may receive a request for analysis from client device 102. In some embodiments, organization computing system 104 may receive the request for climate impact prediction via a website accessed by client device 102 via application 110 executing thereon.

At step 304, organization computing system 104 may prompt the user of client device 102 to select one or more scenarios for the climate impact prediction. Possible scenarios may include a carbon-minimum scenario, a carbon-maximum scenario, and a business as usual scenario. In one embodiment, the scenario may be selected by an automated program. A carbon-minimum scenario may be associated with an approximately 2.8 degree temperature increase in average global temperature. A carbon-maximum scenario may be associated with an approximately 4.6 degree temperature increase in average global temperature. A business as usual scenario may be determined by the United States Department of Energy.

The scenario selection may specify metrics related to the growth of population, gross domestic product (GDP) per capita, greenhouse gas (GHG) emissions, and removals other than $CO_2$ emissions. The user may also specify policy changes, including a carbon price, subsidy, or tax aimed at a particular energy source, policies for more rapid improvement in end-use energy efficiency, utility performance standards, technical breakthroughs affecting the cost and carbon intensity of particular energy sources, or an earlier retirement of existing energy supply sources. The climate data input into the climate model 111 may include indicators such as gross domestic product (GDP), energy source tax and subsidies, interest rates, and capital efficiency percentage. The energy sources may include, without being limited to, coal, gas, oil, renewables, hydro, nuclear, new tech, and biofuel. Climate models including ensemble models may be used to generate the profitability indicators.

At step 306, organization computing system 104 may input one or more metrics associated with the selected one or more scenarios to generate one or more environmental metrics for each energy source. For example, climate module 130 may input the one or more metrics into an energy-climate policy simulator.

In some embodiments, climate module 130 may input the one or more metrics into an Energy-Rapid Overview and Decision-Support (En-ROADS) simulator, available from Climate Interactive©. Climate module 130 may leverage En-ROADS simulator to provide information relating to changes in global GDP, energy efficiency, R&D results, carbon price, fuel mix, and other factors will change carbon emissions and impacts on global climate, such as temperature change. En-ROADS simulator may receive, as input from climate module 130, a measure of global GDP, energy efficiency, R&D results, carbon price, fuel mix, and the like. Such inputs may be received by climate module 130 from climate data integrator 116.

In some embodiments, climate module 130 may utilize a specialized software configured to execute simulations with improved model quality, data connections, and advanced algorithms. In some embodiments, En-ROADS simulator may be utilized with Vensim programming. En-ROADS simulator and other energy-climate policy simulations may apply the principles of system dynamics modeling. In some embodiments, the En-ROADS model may solve a system of nonlinear ordinary difference equations by Euler integration to generate one or more output values. In some embodiments, the En-ROADS model may be configured to solve a system of nonlinear ordinary difference equations by Euler integration using a time step of one-eighth of a year. In some embodiments, the En-ROADS simulator may start at 1990 and simulate through 2100.

Using the En-ROADS simulator, climate module 130 may produce a solution horizon that is recursive-dynamic, and determine a solution that is a partial equilibrium that accounts for price elastic demand, and incorporating short and long term supply, demand, and pricing effects. Although the En-ROADS simulator may be capable of performing computationally intensive sensitivity analysis using, for example, Monte Carlo optimization, in some embodiments, climate module 130 may be configured to utilize simple scenario simulations. In some embodiments, the climate module 130 may execute En-ROADS simulator locally within organization computing system 104. In some embodiments, climate module 130 may execute En-ROADS simulator as a part of a networked computing environment 100.

Climate module 130 may generate a market price of delivered fuels, demand of delivered fuels, average embodied fixed cost of fuel capacity, instant variable cost of fuel supply, carbon tax for delivered fuels, source subsidy for delivered fuels over time, fuel completing capacity, actual retirement rate, and delivered fuel capital lifetime for each fuel type. Climate module 130 may also generate a measure of the market price of electricity and the production for electricity, average embodied fixed cost of electric capacity, instant variable coast of electric supply, source subsidy to electric producers over time, electricity completing capacity, actual retirement rate, and electric supply capital lifetime for each electric source.

At step 308, organization computing system 104 may receive, as output, one or more environmental metrics for each of the one or more energy sources. For example, climate module 130 may generate one or more environmental metrics for each of oil, gas, coal, biofuels, renewable fuel, renewable electric, hydro, new technology, and nuclear energy sources.

Figure 4:
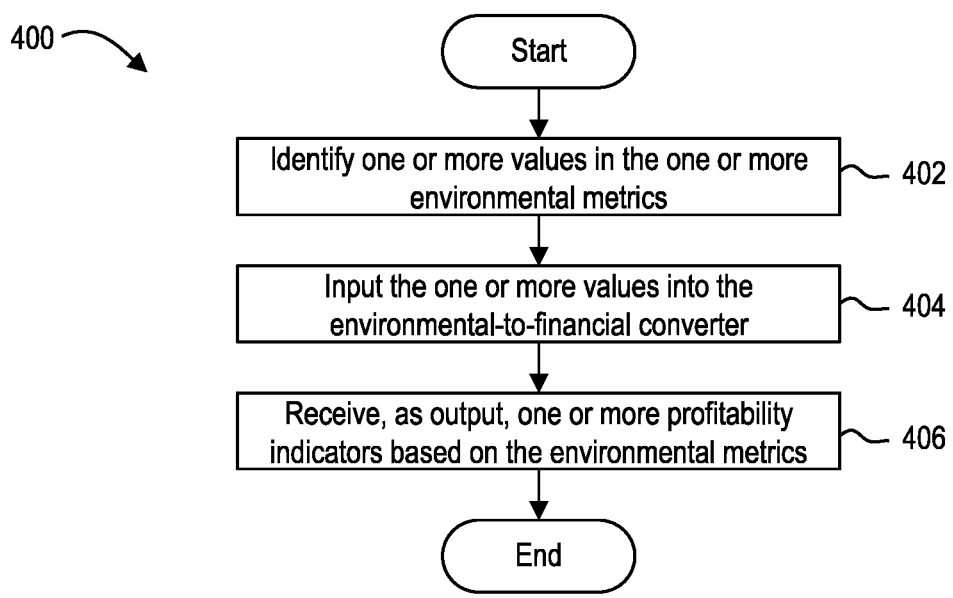
FIG. 4 is a flow diagram illustrating a method of one or more operations included in a second phase of the method discussed in FIG. 2, according to one exemplary embodiment.

FIG. 4 is a flow diagram illustrating a method 400 of operation during phase 204, according to one exemplary embodiment. Method 400 may begin at step 402.

At step 402, climate data analytics module 114 may identify one or more values in one or more environmental metrics. For example, EF converter 124 may identify one or more profitability indicators to be generated. For each profitability indicator, optimization module 120 may identify those environmental metrics output by climate module 130 that may be used to generate each of the one or more profitability indicators. Using a specific example, to generate net present value (NPV), EF converter 124 may identify one or more metrics associated with internal cost of the energy source.

At step 404, climate data analytics module 114 may input the one or more metrics output by climate module 130 into EF converter 124. For example, EF converter 124 may generate one or more profitability indicators for each energy source under each scenario based on the one or more metrics output by climate module 130.

EF converter 124 may generate one or more profitability indicators, such as absolute annualized capital cost, absolute variable cost, absolute revenue, gross margin, and unit gross margin using algorithm 126. Additionally, for capital installed at a specified year for each delivered fuel type and for each source of electricity EF converter 124 may generate one or more profitability indicators related to, without being limited to, the capacity of the investor, the investor gross margin, the equivalent overnight capital costs, investment, equity, debt, investor net cash flow, net present value (NPV), internal rate of return (IRR), and the return on investment (ROI). In some embodiments, EF converter 124 may generate the total NPV and a weighted average of IRR and ROI for all of the constituents.

Accordingly, the profitability indicators generated by the EF converter 124 may include a measure of the NPV, ROI, DCR, IRR and the like for each of the one or more energy sources. In one embodiment the generated profitability indicators may be reflect regional variability.

At step 406, climate data analytics module 114 may receive, as output, one or more profitability indicators based on the environmental metrics. For example, climate data analytics module 114 may receive from EF converter 124 one or more profitability indicators generated by providing metrics generated by climate module 130 into algorithm 126. The one or more profitability indicators provide a financial outlook for each energy source as if each energy source was a given financial subsector or company.

Figure 8:
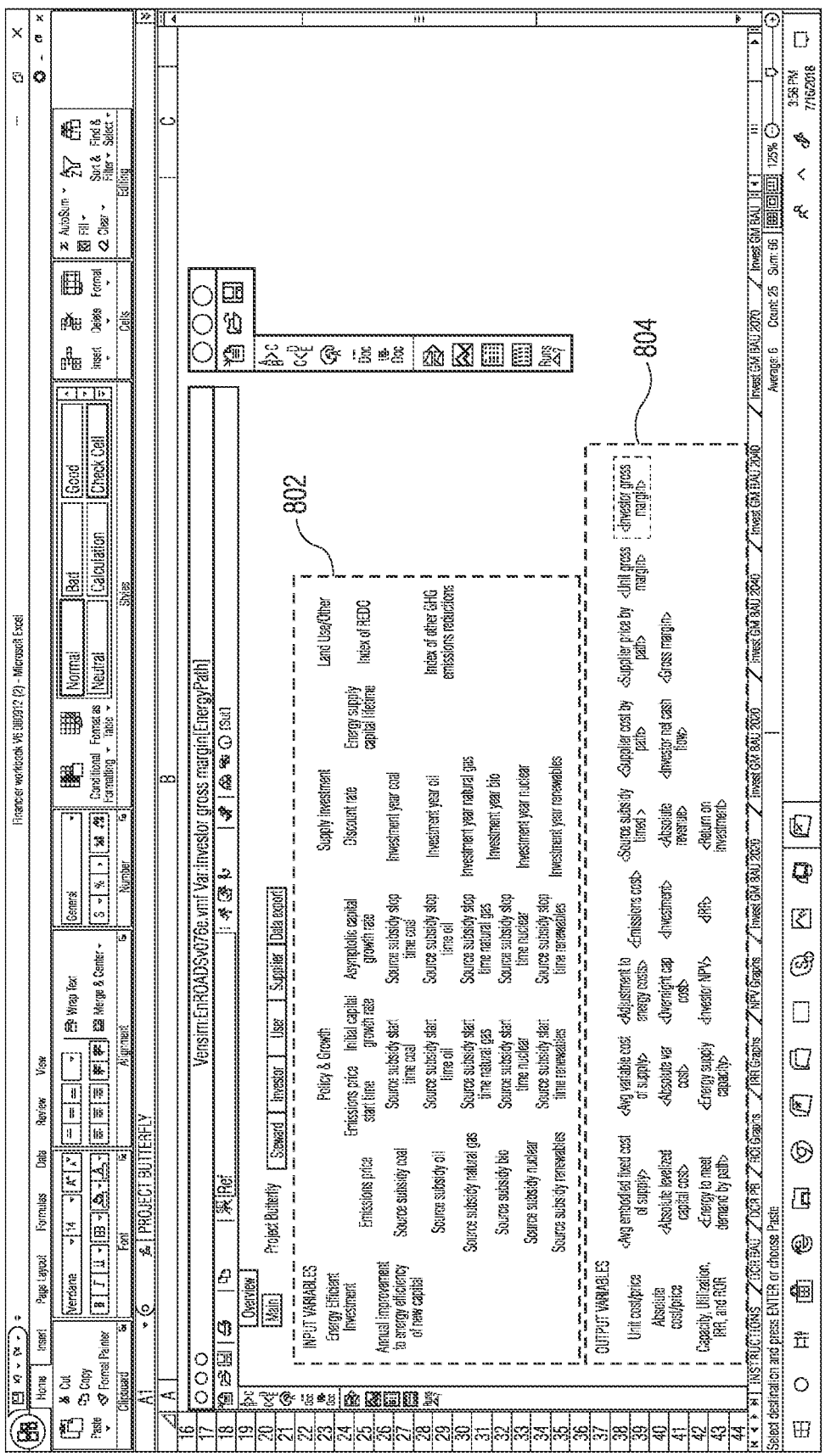
FIG. 8 is a screen shot illustrating an example graphical user interface, according to one exemplary embodiment.

FIG. 8 is a screen shot illustrating example graphical user interface (GUI) 800, according to one exemplary embodiment. As illustrated in GUI 800, there may be one or more inputs 802 and one or more outputs 804. One or more inputs 802 may correspond to the one or more environmental metrics generated by climate module 130, discussed above in conjunction with FIG. 3. One or more outputs 804 may correspond to the one or more profitability indicators generated by climate data analytics module 114.

Figure 5:
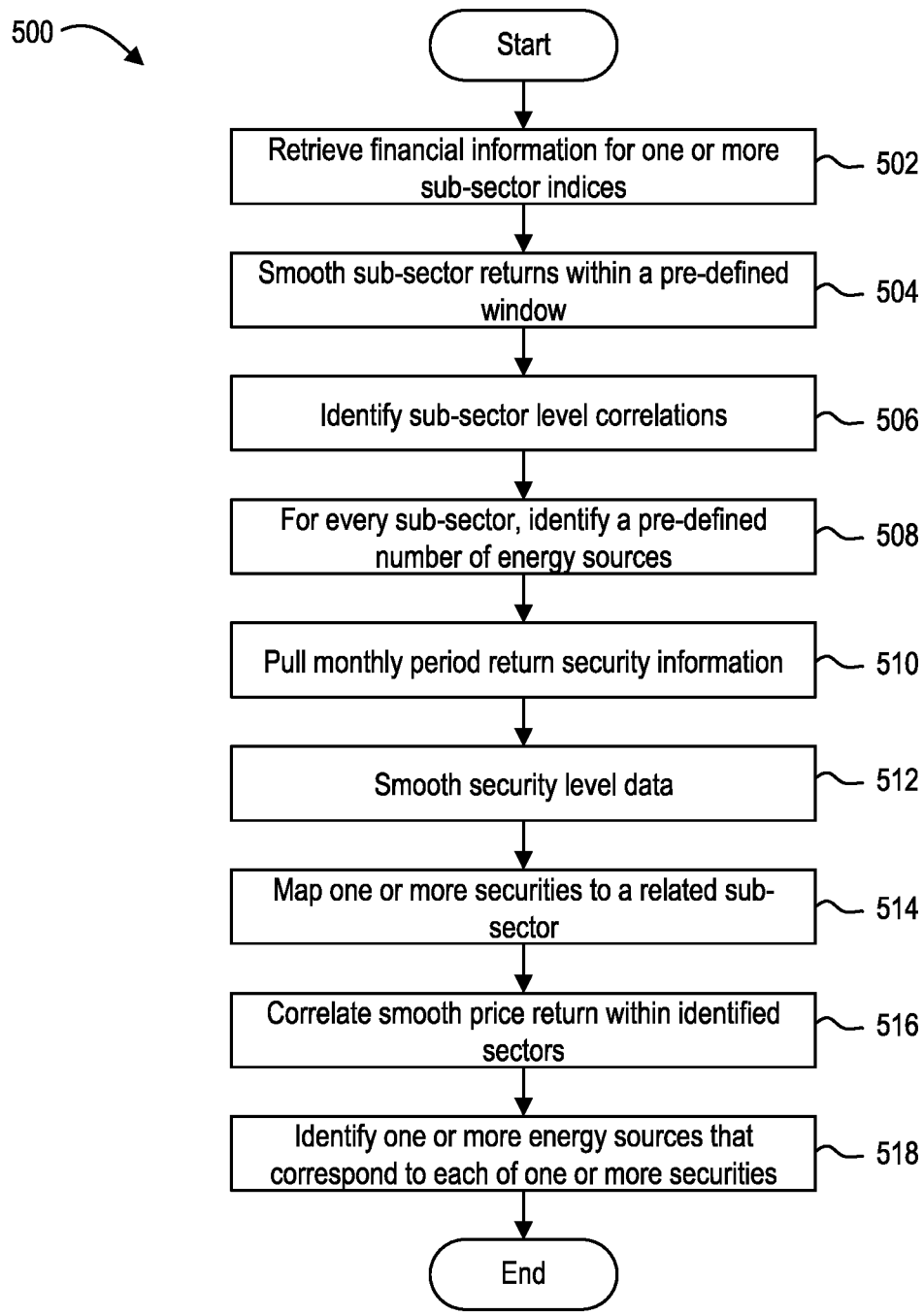
FIG. 5 is a flow diagram illustrating a method of one or more operations included in a third phase of the method discussed in FIG. 2, according to one exemplary embodiment.

FIG. 5 is a flow chart illustrating a method 500 of operations during phase 206, according to one exemplary embodiment. Method 500 may begin at step 502.

At step 502, climate data analytics module 114 may retrieve (e.g., pull) financial information from one or more subsector indices. For example, financial data integrator 118 may retrieve from one or more financial data sources 106 the financial data of one or more subsector indices. In some embodiments, the one or more data sources 106 hosting the financial data may be global industry classification standards (GICS) developed by Morgan Stanley Capital International (MSCI). In some embodiments, financial data integrator 118 may retrieve financial information for 24 GICs subdivisions). Climate data analytics module 114 may further retrieve ROI information under one or more pre-selected scenarios (e.g., business-as-usual).

In some embodiments, financial data integrator 118 may identify a portfolio including a list of securities. In some embodiments, the list of securities may correspond with a benchmark such as the S&P 500, Russell 100 or the like. In some embodiments, the climate data analytics module 114 may be provided with the data set from a user computer. In some embodiments, the portfolio or benchmark of interest may be selected based on an index requirement. The index requirement may be based on a Market Focus (i.e., Domestic, International), Fund theme (i.e., Sector of Interest: Technology, Energy), Factor Choices (i.e., Growth, Value) and the like. Once identified, climate data analytics module 114 may request data and information related to the list of securities from one or more financial data source 106 in communication with the climate data analytics module 114. Data sources that provide data and information related to the list of securities may include financial data and software resources that provide real-time news and quotes, company and portfolio analysis, multi-company comparisons, industry analysis, company screening, portfolio optimization and simulation, predictive risk measurements, alphatesting and tools to value and analyze fixed income securities and portfolios. This data and information may include financial data and information.

In some embodiments, the financial data integrator 118 may perform the discussed identification and retrieval steps. Financial data integrator 118 may pull time series data on stock prices for a benchmark, calculate the returns from the time series data on stock prices for the benchmark, calculate the average returns for specific securities within the benchmark and find the downside variance-covariance of all individual securities within the benchmark based on Sortino ratios. The financial data integrator 118 may also determine one or more of a data sets' minimum and maximum weights, sector diversity and financial risk coefficients.

At step 504, climate data analytics module 114 may smooth the retrieved financial information within a predefined window. For example, optimization module 120 may smooth the retrieved financial information for the one or more subsector indices with a five-point window locally weighted regression using, for example, data from a previous range of years (e.g., the previous 6 years). Exemplary weighted regressions may include locally weighted regressions such as, but not limited to, a locally weighted scatterplot smoothing (LOWESS). Smoothing the retrieved financial information aids in identifying relationships among variables, as well as trends in the information.

At step 506, climate data analytics module 114 may downward deploy the one or more profitability indicators generated by EF converter 124 to one or more financial subsectors, to identify sector level correlations. Optimization module 120 may identify correlations between the one or more energy sources and one or more financial subsectors using, for example, Kendall's tau coefficient. Kendall's tau coefficient is used to measure association between the one or more profitability indicators of each energy source and the financial information of the one or more financial subsectors. Kendall's tau coefficient may provide a ranking of relevance between each financial subsector and each energy source.

Such operations may include:

```
def plot_smoothing ( ) :
    fig = plt.figure (figsize= (20, 12) )
    timely_sec = sec.loc [2003:2018]
    for idx, ind in enumerate (timely_sec.columns [20:24] ) :
        smoothed = ent.smooth (timely_sec.loc [: , ind] , 5)
        ax = fig.add_subplot (2, 2, idx+1)
        ax.plot (timely_sec.loc [: , ind], 'k=.', linewidth=1)
        ax.plot (smoothed, 'r', linewidth=2)
        ax.set_title (timely_sec.loc [: , ind] .name, size=18)
        ax.set_xlabel ('Year', size=18)
        ax.set_ylabel ('Qtrly Period Ret Propn', size=18)
        ax.tick_params (labelsize=18)
        ax.grid (False)
    fig.suptitle ('Smoothed Returns', size=30)
    fig.subplots_adjust (top=.9, bottom=0.08, left=0.1, right=0.9m
        hspace=0.4, wspace=0.3)
    return
```

Figure 9:
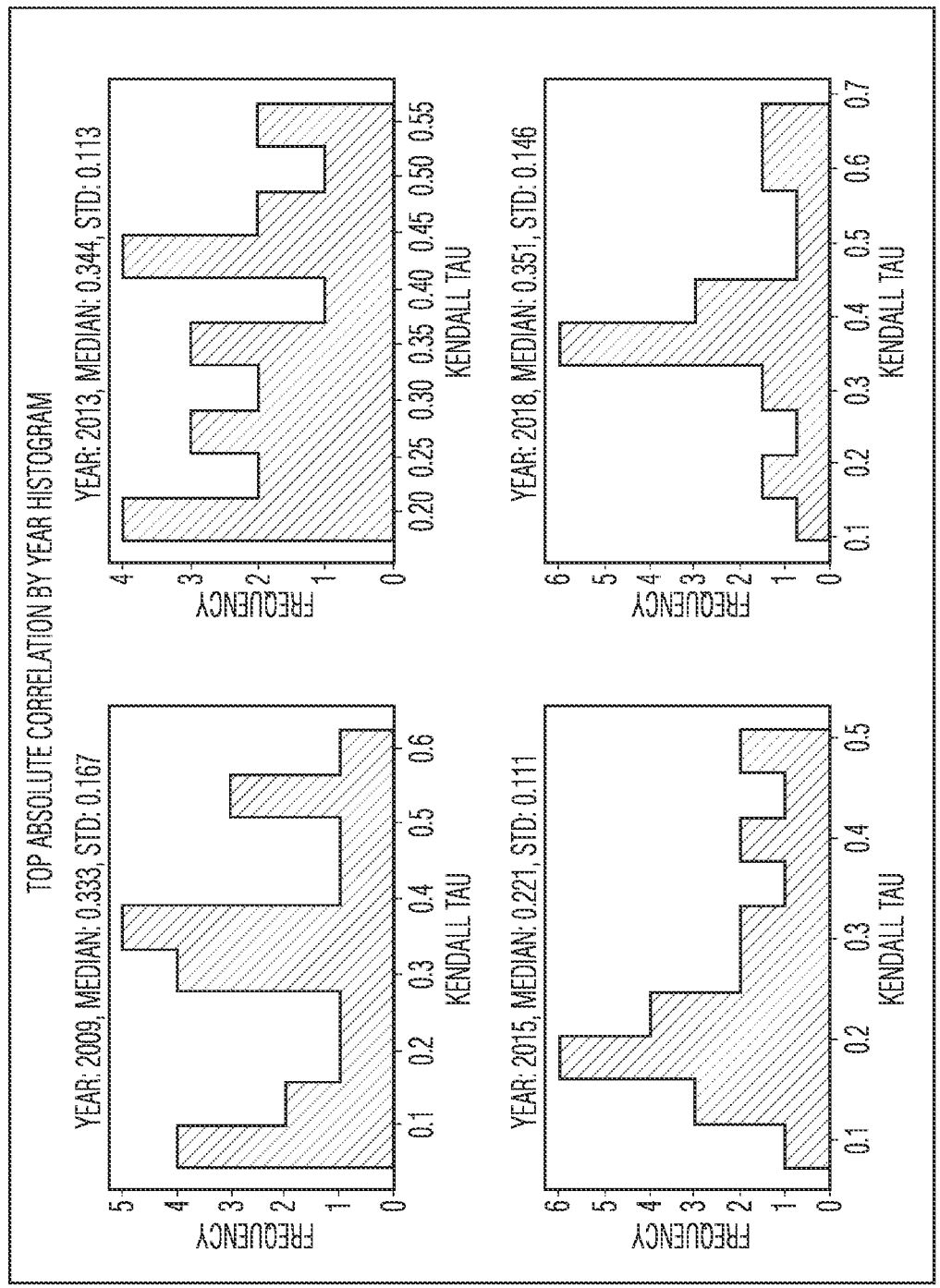
FIG. 9 is a screen shot illustrating an example graphical user interface, according to one exemplary embodiment.

FIG. 9 is a screen shot illustrating example GUI 900, according to one exemplary embodiment. As illustrated in FIG. 9, GUI 900 may include one or more histograms. Each histogram represents a correlation between one or more energy sources and one or more financial subsectors. The peaks of each histogram may represent the most correlated energy sources and financial subsectors.

Referring back to FIG. 5, at step 508, climate data analytics module 114 may identify one or more energy sources that correspond to each of the one or more financial subsectors. In some embodiments, optimization module 120 may identify the four most relevant energy sources to each of the twenty-four financial subsectors. In those embodiments in which all energy sources are equally correlated with a particular financial subsector, optimization module 120 may select those four energy sources that are the "greenest." Greenest, for example, may correspond to the energy source have the smallest Carbon footprint.

At step 510, climate data analytics module 114 may retrieve financial data related to one or more securities. For example, financial data integrator 118 may retrieve from one or more financial data sources 106 monthly return information for one or more securities.

At step 512, climate data analytics module 114 may smooth the retrieved financial information. For example, optimization module 120 may smooth the security level information using a weighted regression. Such weighting regression may include LOWESS regressions. Smoothing the retrieved financial information aids in identifying relationships among variables, as well as trends in the information.

At step 514, climate data analytics module 114 may map the one or more securities to a respective financial subsector. For example, optimization module 120 may identify one or more financial subsectors to which each respective securities applies. In some embodiments, climate data analytics module 114 may procure economic classification data for a given security, such as, without being limited to, economic classification according to the Global Industry Classification Standard (GICS). Each economic sector may be mapped to a subset of an energy source. Using this mapping, climate data analytics module 114 may map each security to a given energy source from a financial subsector of its economic sector.

At step 516, climate data analytics module 114 may correlate the security level information with the mappings from step 508. For example, optimization module 120 may correlate the security level information with the four most relevant energy sources identified above in conjunction with step 508.

At step 518, climate data analytics module 114 may identify one or more energy sources that correspond to each of the one or more securities. For example, continuing with the example in step 508 above, optimization module 120 may identify the two most relevant energy sources for each of the one or more securities. In those embodiments in which three or more energy sources are equally relevant to a respective security, optimization module 120 may break any ties by, for example, selecting the "greenest" energy source.

FIG. 10 is a screen shot illustrating example GUI 1000, according to one exemplary embodiment. As illustrated, GUI 1000 may include one or more graphical representations of returns by subsector from 2016 to 2018. Such GUI 1000 may be accessible to user via client device 102.

Figure 6:
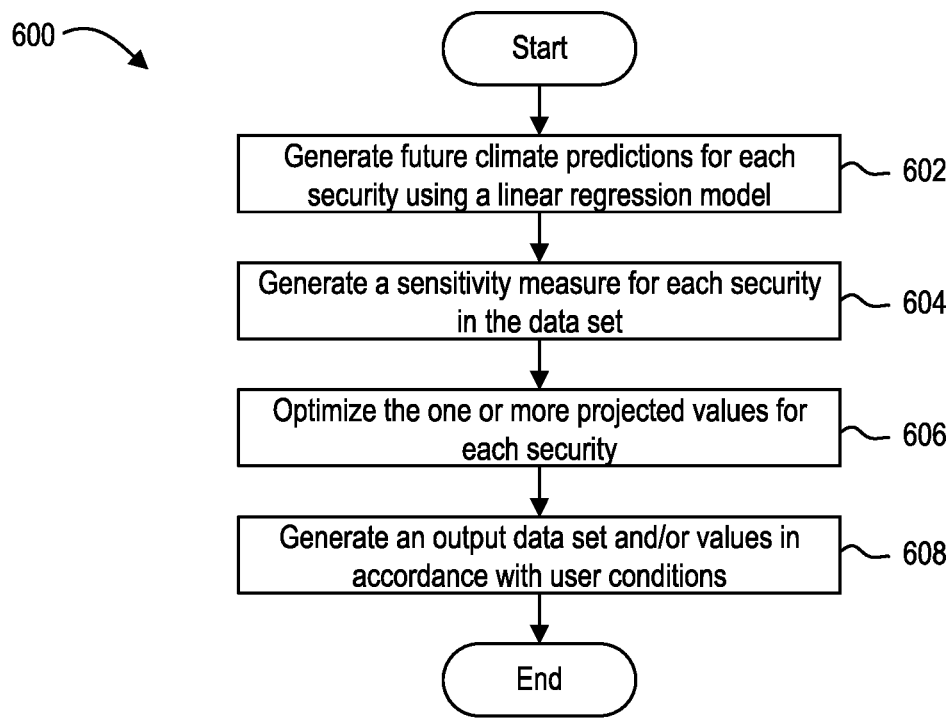
FIG. 6 is a flow diagram illustrating a method of one or more operations included in a fourth phase of the method discussed in FIG. 2, according to one exemplary embodiment.

FIG. 6 is a flow diagram illustrating a method 600 of operations during phase 208, according to one exemplary embodiment. Method 600 involves predicting future climate impact for each security (or financial subsector) and presenting that information to the requestor. In general, according to method 600, one or more mapped energy sector(s) may be used as input variable(s) to forecast a performance of a security. Method 600 may use correlations (described below) to identify energy mappings. Once energy mappings are identified, profitability indicators of the mapped energy sources (e.g., a ROI) may be used as an input (e.g., explanatory variables) to predict scenario-specific return performance of the securities. Method 600 may begin at step 602.

At step 602, climate data analytics module 114 may be configured to generate future climate predictions for each security using a regression model. Such regression models may include a linear regression model. For example, climate data analytics module 114 may use the identified energy mappings by identifying one or more profitability indicators associated with a given security. As input to the regression model, climate data analytics module 114 may provide the one or more profitability indicators to predict a scenario-specific return performance for the security. Further, in some embodiments, for each security, output module 122 may retrieve climate data generated by climate module 130 for each mapped energy source. In some embodiments, output module 122 may retrieve the climate data according to one or more selected scenarios. The retrieved climate data includes future climate data projections. Output module 122 may then project the future climate impact for each security using the future climate data projections and historical price returns by leveraging one or more linear regression algorithms. The projections may be compiled in a data set to be provided to the user.

At step 604, output module 122 may generate a sensitivity measure for each security by analyzing the spread of each security's projected returns across each of the given scenarios.

In some embodiments, output module 122 may generate one or more scores for each securities' returns across one or more scenarios. For example, output module 122 may generate three scores for each of a business as usual (BAU) scenario, a carbon max scenario, and a carbon min scenario.

In some embodiments, output module 122 may generate a spread of a security's expected performance using expected returns. A higher spread indicates a higher sensitivity towards economic and policy changes. A low spread indicates lower risk towards these changes. A min max area value indicates the min max area value for stocks in a security's portfolio. A min max area value may be calculated using:

$$MMA_s = \frac{1}{|R_s(BAU)|}\left|\sum_{t=t*}^{T} R_{x,ts} - R_{m,ts}\right|$$

where t*>TOD (Time of Day), $R_{x,ts}$ are expected returns computing using regression to carbon max scenario, and $R_{m,ts}$ are expected returns computing using carbon min scenario.

In some embodiments, output module 122 may generate a min max draw down score. The min max draw down score may reflect the spread of a constituent's expected performance as computed using Expected Returns for the Carbon Minimum and Carbon Maximum scenarios. A higher spread may be indicative of a higher risk towards economic and policy changes.

In some embodiments, output module 122 may generate an affinity towards carbon minimum score (ACM). The ACM may reflect the spread of difference between the expected returns for the carbon minimum scenario and the expected returns of the business as usual scenario. A positive score for the ACM may indicate that a constituent is expected to perform better a carbon minimum scenario. A negative score for the ACM may indicate that the constituent is expected to perform better for a carbon maximum scenario.

The ACM may be defined as follows:

$$ACM_S = \frac{1}{|R_s(BAU)|}\sum_{t=t*}^{T}(R_{m,ts}, R_{BAU,ts})$$

where t*>TOD (Time of Deviation), $R_{BAU,ts}$ are the expected returns computed using a regression to carbon business as usual scenario, $R_{m,ts}$ are the expected returns computed using a carbon min scenario, and $\overline{R_S}$ are the mean returns computed using the business as usual scenario.

In one embodiment, output module 122 may generate an affinity towards carbon maximum score (AXM). The AXM may reflect the spread of difference between the expected returns for the carbon maximum scenario and the expected returns of the business as usual scenario. A positive AXM may indicate that a constituent is expected to perform better under a carbon maximum scenario while a negative score may indicate that a constituent is expected to perform better under a carbon minimum scenario.

The AXM may be defined as follows:

$$AXM_s = \frac{1}{|\overline{R_s}(BAU)|} \sum_{t=t*}^{T} (R_{X,ts}, R_{BAU,ts})$$

where t*>TOD (Time of Deviation) $R_{x,ts}$ are the expected returns computed using a regression to carbon max scenario, $R_{BAU,ts}$ are the expected returns computed using a business as usual scenario, and $\overline{R_S}(BAU)$ are the expected returns computed using the business as usual scenario.

In some embodiments, output module 120 may compute the securities' energy dependency using specialized software that is configured for computationally intensive calculations. In one embodiment, python Scikit-learn may be used to run multiple support vector machine (SVM) regressions in order to compute the constituents' energy dependency. SVMs may be used for their effectiveness in high dimensional spaces, ability to be run in cases where the number of dimensions is greater than the number of samples. SVMs may also be memory efficient as they may use support vectors including a subset of training points in the training function. Additionally SVMs may be versatile as different kernel functions can be specified for the decision function.

At step 606, output module 122 may optimize the one or more projected values for each security. For example, output module 122 may generate one or more data sets that comprise the one or more projected values for each security. Such optimization equation may be:

$$Y_{\hat{W}\overline{R}} - (1-Y)_{\hat{W}\Sigma W}$$

where $Y \in (0,1) | \forall\ s \in S$, $w_s \geq 0.001$ (Min weight constraint), $w_s \leq 0.05$ (Max weight constraint), and $\Sigma w_s = 1.0$ In one embodiment, output module 122 may use securities sensitivities as a constraint and optimize the data set using a Markowitz Optimization Process. In one embodiment, statistical analysis and big data may be used to determine the objective function in the Markowitz Optimization process. In one embodiment, a convex optimizer package with a beta reduction component may be used. In general, any suitable optimization model may be used to optimize the data in accordance with embodiments described herein.

In some embodiments, output module 122 may optimize the data set for higher returns, less risk and higher carbon reductions. Output module 122 may provide a weighting for constituents of the data set such that any data set constructed from the provided weightings would have a lower aggregate climate risk in comparison to the benchmark.

In some embodiments, output module 122 may optimize the data set towards preferred scenarios. For example, if a user were interested in investing in a portfolio that outperforms in carbon-min scenario output module 122 may re-weight the securities in accordance with the user's socio-economic, policy and climate preferences.

In some embodiments, output module 122 may utilize a convex optimization utility that is based on Python. For example, output module 122 may use a Basic Linear Algebra Subprograms (BLAS) that are capable of efficiently performing matrix based mathematical operations; thereby allowing the output module 122 to optimize larger amounts of data using algorithms that utilize matrices without taxing either the processor or memory components of the server system 102. In addition or as an alternative, output module 122 may solve a non-convex optimization problem using a Generalized Simulated Annealing for Global Optimization package. In one embodiment, output module 122 may analyze the conditional value at risk to assess the likelihood that a specific loss will exceed the value at risk.

In some embodiments, output module 122 may optimize the data set and provide a set of weights. The set of weights may be generated on various time scales including every week, month, quarter, or year. The weights may be used to compute indexes, portfolios, and holdings for exchange traded funds.

In one embodiment, the weightings produced by output module 122 may be used to construct smart climate indices that are designed to track well established global indices such as the S&P500, Russell 1000 and the like. However, the smart climate indices may be optimized to lower beta, volatility and tracking error while increasing climate impact and financial performance. The smart climate indices may also be used for ETF creation and benchmarked performance evaluations.

In some embodiments, the weightings produced by the output module 122 may be used to construct a sensitivity restricted portfolio. The sensitivity restricted portfolio may be configured to maximize the returns of the portfolio subject to an ESG based constraint and an Energy Mix Transition Risk (EMTR) score constraint.

In some embodiments, the weightings produced by the output module 122 may be used to construct a carbon minimum biased portfolio by maximizing the returns of the portfolio subject to an ESG based constraints and an ACM constraint.

In some embodiments, the weightings produced by output module 122 may be used to construct a carbon minimum biased profile by maximizing the returns of the portfolio subject to ESG constraints and an AXM constraint.

In some embodiments, the weightings produced by the output module 122 may be used to provide portfolio optimization for climate and energy volatility, and may include scenario analysis and shock testing. The weightings may be used to evaluate client portfolios and climate impact.

In some embodiments, output module 122 may provide users with new weights with no addition or subtraction of constituents from the data set. In one embodiment, output module 122 may produce optimized data sets that may provide the best opportunities for gain with the least risk, materially reduce risk of divergence in the global economy from baseline to high/low carbon scenarios, contain constituents having greater stability and improved performance under more climate friendly policies and activities, contain constituents having a lower predicted tracking error against a benchmark data set, and/or contain constituents that have the highest average carbon reductions over time frames.

At step 608, output module 122 may generate an output data set and/or values in accordance with user conditions. In some embodiments, output module 122 may output a set of weights that are provided quarterly to a separate index computation entity. The index computation entity may use the weights to compute daily index performance and provide the computed index to one or more financial portals.

In some embodiments, individual public security level risk and optimization scores (weightings and related data) produced by the climate module 130, EF converter 124, optimization module 120, and output module 122 may be provided to third parties such as data providers for inclusion into their own system.

In some embodiments, output module 122 transmit information to client device 102, such that client device may generate or render a graphical user interface (GUI) that is configured to display data and information related to the climate module 130, EF converter 124, optimization module 120, and output module 122. In some embodiments, the information may be accessible to a user via application 110 executing on client device 102.

Figure 11A:
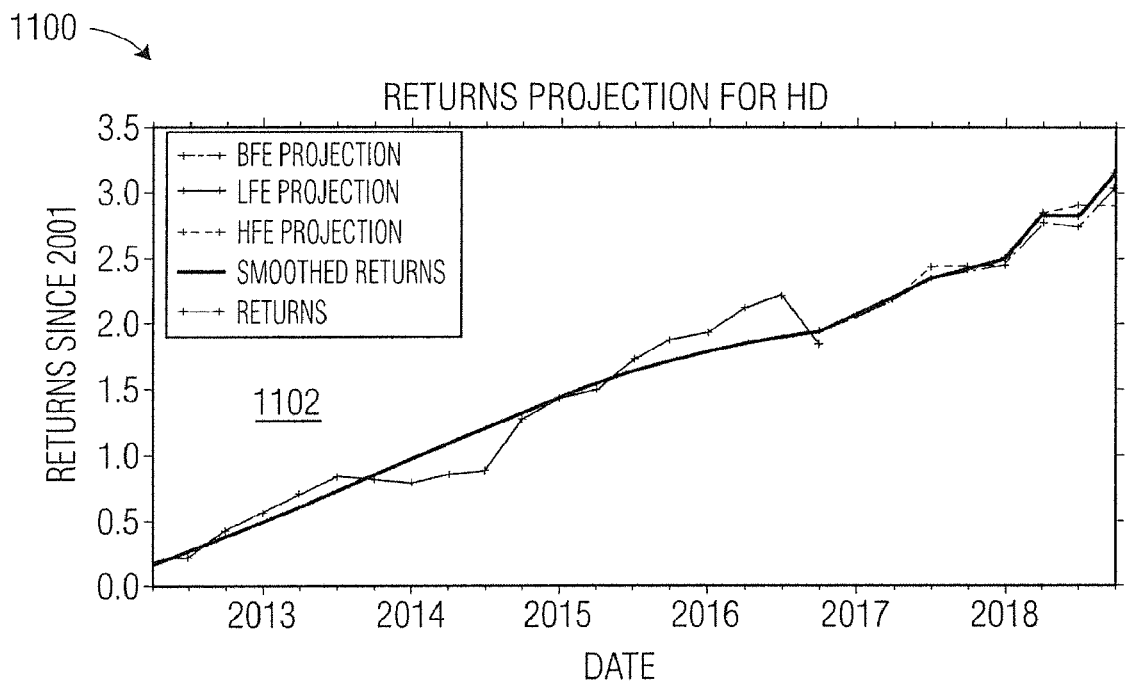
FIGS. 11A and 11B are screen shots illustrating an example graphical user interface, according to one exemplary embodiment.
Figure 11B:
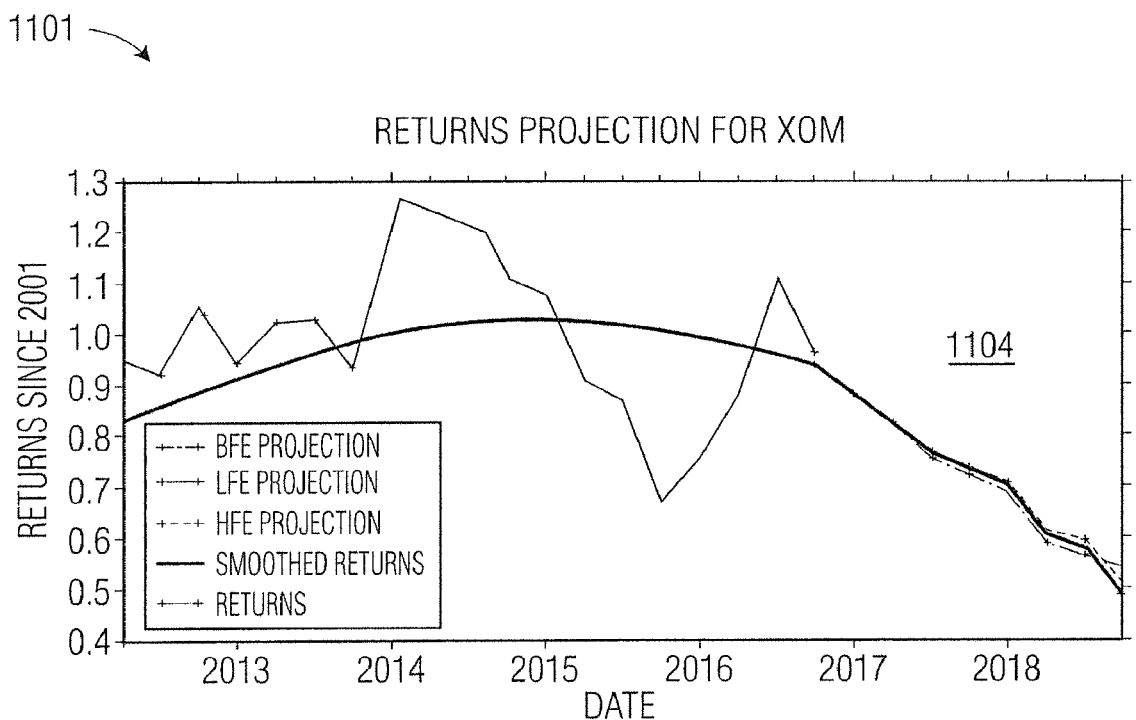

FIGS. 11A and 11B are screen shots illustrating example GUI 1100 and GUI 1101, respectively, according to one exemplary embodiment. GUI 1100 may include graph 1102. GUI 1101 may include graph 1104. Each graph 1102, 1104 may represent projections for a respective company. As illustrated, each graph 1102 and 1104 visually depicts projections for each company under a plurality of scenarios.

Figure 12:
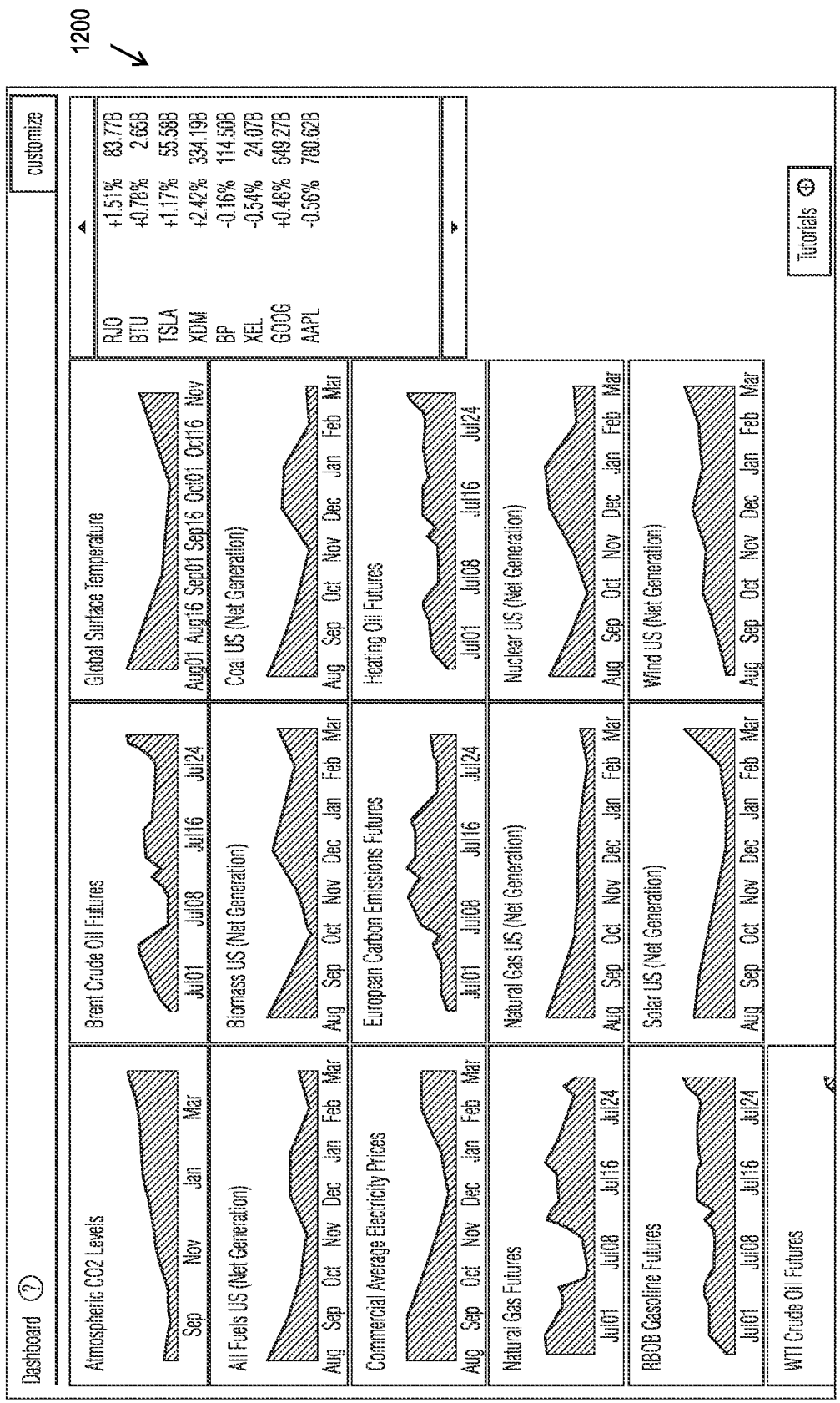
FIG. 12 is a screen shot illustrating an example graphical user interface, according to one exemplary embodiment.

FIG. 12 is a screen shot illustrating example GUI 1200, according to one exemplary embodiment. As illustrated, a user may login to a website to view a dashboard containing data and information related to climate data analytics module 104 from client device 102 via application 110. In some embodiments, the dashboard may display time series information for climate and financial data. The time series information for climate and financial data may be generated by climate data integrator 116 and financial data integrator 118. The dashboard may also display financial index information.

Systems and methods of the present disclosure may include and/or may be implemented by one or more specialized computers or other suitable components including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) and/or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with environment 100 described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 7:
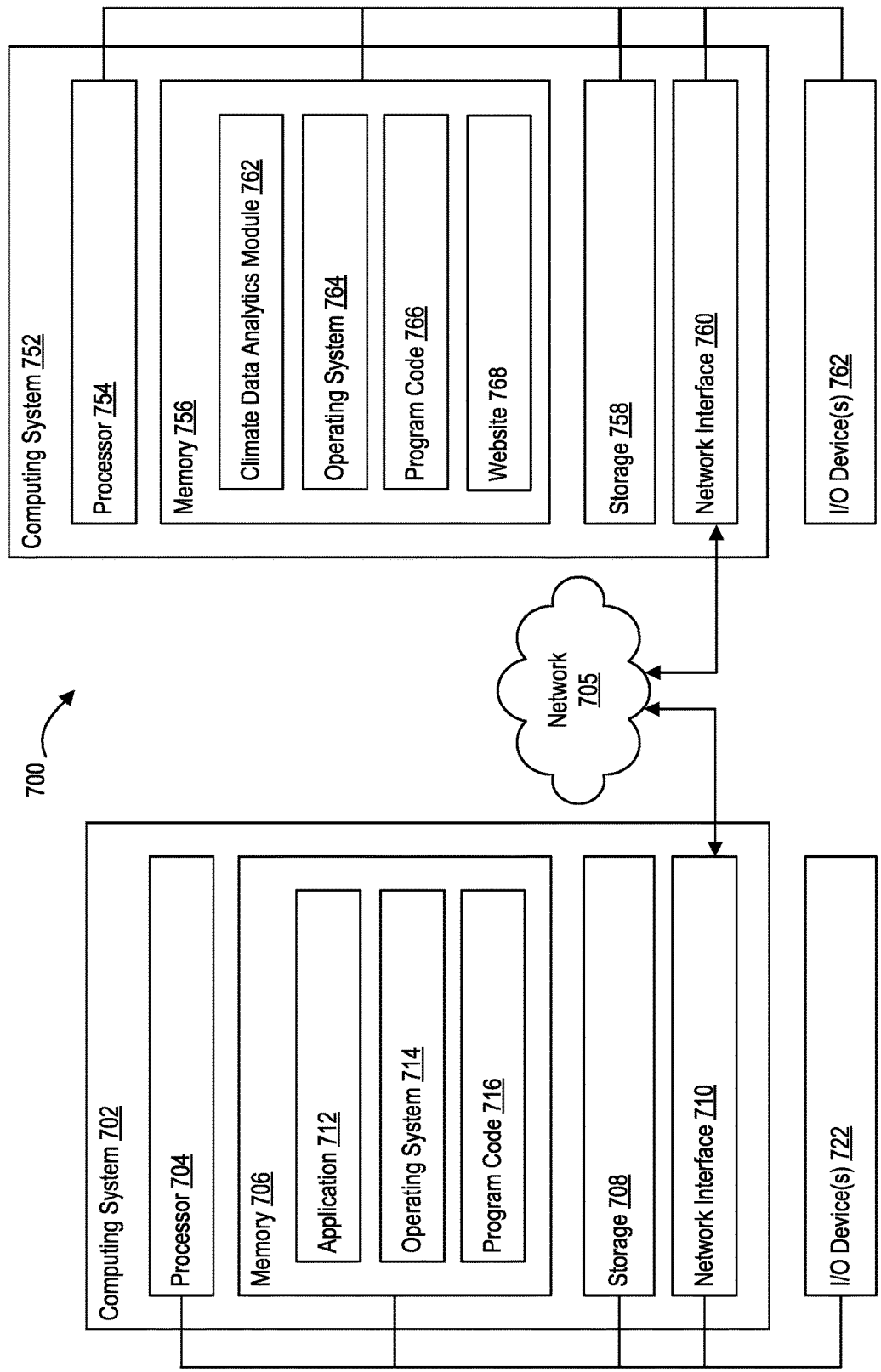
FIG. 7 is a functional block diagram illustrating a computing environment, according to one exemplary embodiment.

FIG. 7 is a block diagram illustrating an exemplary computing environment 700, according to some embodiments. Computing environment 700 includes computing system 702 and computing system 752. Computing system 702 may be representative of client device 102. Computing system 752 may be representative of organization computing system 104.

Computing system 702 may include processor 704, memory 706, storage 708, and network interface 710. In some embodiments, computing system 702 may be coupled to one or more input/output (I/O) device(s) 722 (e.g., keyboard, mouse, display, etc.).

Processor 704 may retrieve and execute program code 716 (i.e., programming instructions) stored in memory 706, as well as store and retrieve application data. Processor 704 may be included to be representative of a single processor, multiple processors, a single processor having multiple processing cores, and the like. Network interface 710 may be any type of network communications allowing computing system 702 to communicate externally via computing network 705. For example, network interface 710 may be configured to enable external communication with computing system 752.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 706 may include application 712, operating system 714, and program code 716. Program code 716 may be accessed by processor 704 for processing (i.e., executing program instructions). Program code 716 may include, for example, executable instructions for communicating with computing system 752 to display one or more pages of website 768. Application 712 may enable a user of computing system 702 to access a functionality of computing system 752. For example, application 712 may access content managed by computing system 752, such as website 768. The content that is displayed to a user of computing system 702 may be transmitted from computing system 752 to computing system 702, and subsequently processed by application 712 for display through a graphical user interface (GUI) of computing system 702.

Computing system 752 may include processor 754, memory 756, storage 758, and network interface 760. In some embodiments, computing system 752 may be coupled to one or more I/O device(s) 762.

Processor 754 may retrieve and execute program code 766 (i.e., programming instructions) stored in memory 756, as well as store and retrieve application data. Processor 754 is included to be representative of a single processor, multiple processors, a single processor having multiple processing cores, and the like. Network interface 760 may be any type of network communications enabling computing system 752 to communicate externally via computing network 705. For example, network interface 760 allows computing system 752 to communicate with computer system 702.

Storage 758 may be, for example, a disk storage device. Although shown as a single unit, storage 758 may be a combination of fixed and/or removable storage devices, such as fixed disk drives, removable memory cards, optical storage, network attached storage (NAS), storage area network (SAN), and the like.

Memory 756 may include climate data analytics module 762, operating system 764, program code 766, and website 768. Program code 766 may be accessed by processor 754 for processing (i.e., executing program instructions). Program code 766 may include, for example, executable instructions configured to perform steps discussed above in conjunction with FIGS. 2-6. As an example, processor 754 may access program code 766 to perform operations for assessing climate change risk at a security level. Website 768 may be accessed by computing system 702. For example, website 768 may include content accessed by computing system 702 via a web browser or application.

Climate data analytics module 762 may be configured to predict the environmental performance of one or more companies based one or more energy sources. For example, climate data analytics module 762 may generate one or more environmental metrics for each energy source based on one or more scenarios selected by an end user. Climate data analytics module 762 may then convert the generated climate data for each energy source into one or more profitability indicators. The climate data to financial data conversion allows climate data analytics module 762 to downward correlate each energy source to a respective industry subsector using historical price returns of each industry subsector. Within each industry subsector, the present system can identify one or more companies to which each energy source maps. From this information, the present system is able to assess climate change risk associated with each company based on operations of the company.

Figure 13:
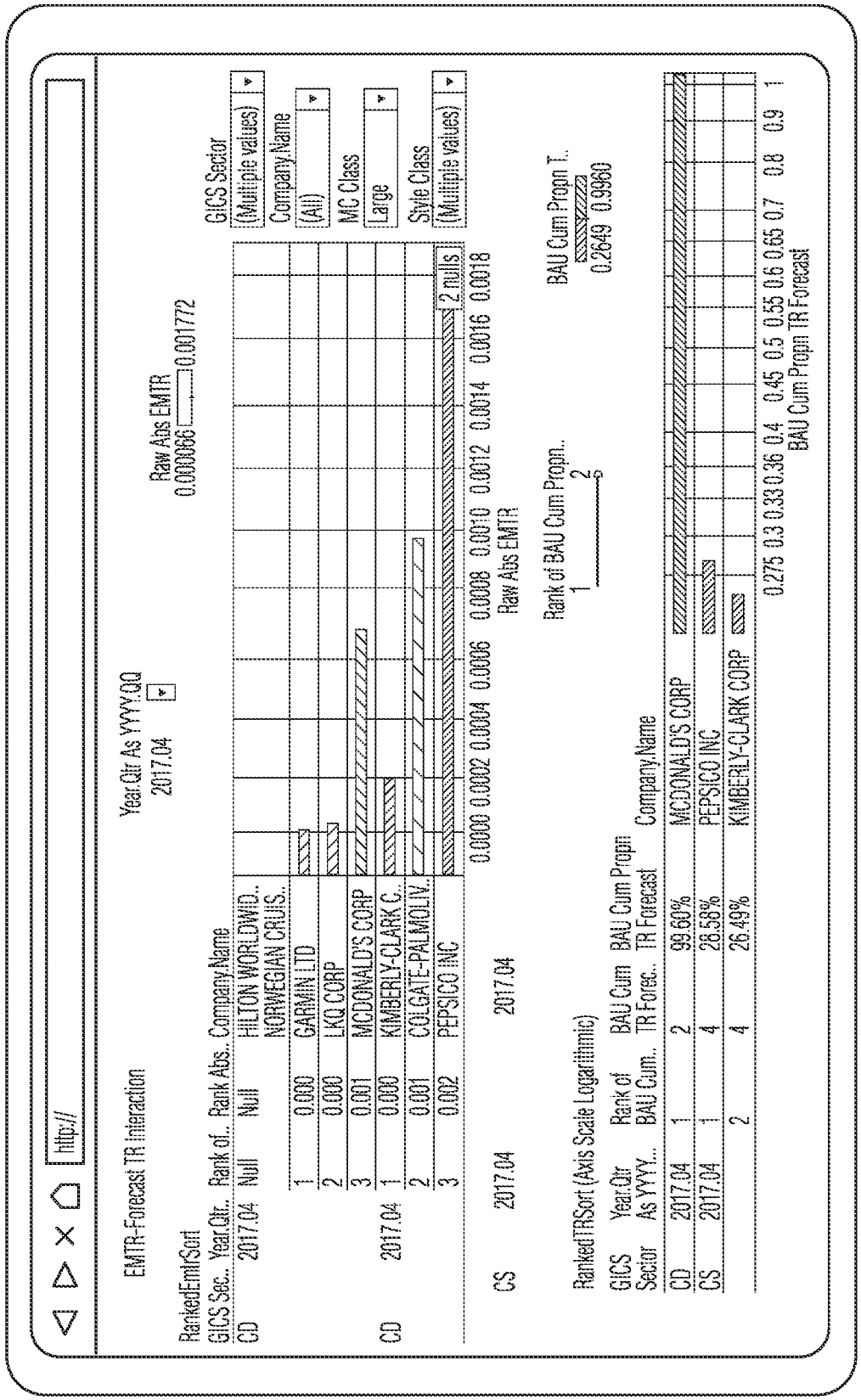
FIG. 13 is a screen shot illustrating an example graphical user interface, according to one exemplary embodiment.
Figure 14:
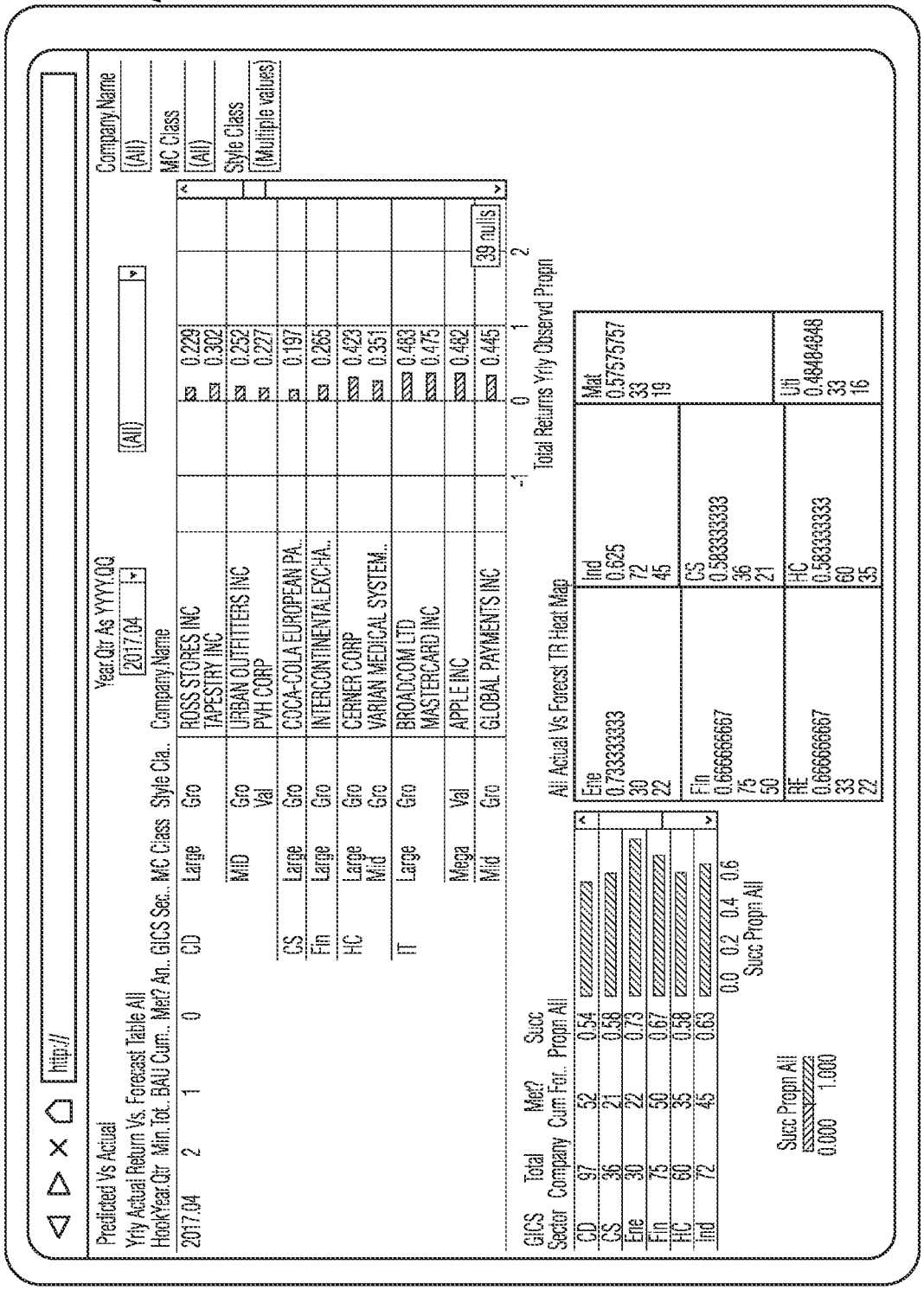
FIG. 14 is a screen shot illustrating an example graphical user interface, according to one exemplary embodiment.

Referring next to FIGS. 13 and 14, example graphical user interfaces illustrating various scenario-predictive/forecast return performance indicators that may be created by climate data analytics module 114. FIG. 13 is a screen shot illustrating an example graphical user interface (GUI) 1300, according to one exemplary embodiment. As illustrated, GUI 1300 may represent a user interface that may be generated by climate data analytics module 114 to illustrate one or more outputs of climate data analytics module 114. For example, an energy mixed transition risk-forecast transition risk interaction may be displayed via GUI 1300. As illustrated, climate data analytics module 114 may integrate one or more outputs generated, for example, using the one or more operations discussed above in conjunction with FIGS. 2-6 with traditional stock screening variables that may be retrieved using financial data integrator 118.

Via GUI 1300, an end user may be able to filter various stocks using traditional stock characters, such as, but not limited to, market cap, GICS economic sector, and style, along with one or more climate risk scores and rankings generated by climate data analytics module 114. Accordingly, GUI 1300 provides an integrated interface that allows users to filter stock information based on climate risk scores and ranking, as well as more traditional financial variables. Conventional systems are simply unable to produce such an interface due to inaccuracies in reported environmental data, and non-uniformity in the portions of environmental data that are accurate.

Climate data analytics module 114 may transmit the generated GUI 1300 to, for example, client device 102, such that client device 102 may render GUI 1300 and display GUI 1300 to the user via a display of client device 102. For example, client device 102 may display GUI 1300 via application 110 executing thereon.

FIG. 14 is a screen shot illustrating an example graphical user interface (GUI) 1400, according to one exemplary embodiment. As illustrated, GUI 1400 may represent a user interface that may be generated by climate data analytics module 114 to illustrate one or more outputs of climate data analytics module 114. For example, GUI 1400 may include a comparison between actual and forecasted stock performance.

Climate data analytics module 114 may transmit the generated GUI 1400 to, for example, client device 102, such that client device 102 may render GUI 1400 and display GUI 1400 to the user via a display of client device 102. For example, client device 102 may display GUI 1400 via application 110 executing thereon.

Referring next to FIGS. 15-20D, an example system and method of climate data processing and impact prediction are described, according to another embodiment of the present disclosure. Similar to the system described above, the climate data processing/impact prediction system described below also may assess climate change risk at a security level and generate environmental metrics (according to a downward deployment of profitability indicators, generally referred to below as an energy score). In addition, the system and method described below may be configured to determine a climate transition risk (also referred to herein as a transition risk or T-Risk).

In general, the energy score described above may provide a measure of a resilience of a company and/or indexes of companies to climate change (risk) scenarios. The transition risk (described below) may be configured to measure an alignment of a company to a given climate change scenario. For example, a transition risk metric (e.g., a score) may aid a company in reducing their investment exposure to climate change and evaluate the relative alignment of a portfolio to certain carbon goals or targets (e.g., goals established by the United Nations under the Paris Accord, the United Nations Framework Convention on Climate Change (UNFCCC), the Intergovernmental Panel on Climate Change (IPCC), etc.).

In order to evaluate and measure a climate change risk, it may be desirable to consider all potential risks associated with climate, including not only physical risk but also a transition risk. Such a metric may aid in assessing how climate change may impact a company and how the company is likely to respond to future risk. Assessment of climate risk is also becoming an important metric to managing investment risk, and may become difficult to quantify if institutions fail to properly manage their climate risk and transition to a more sustainable operating structure. Therefore, identifying, measuring, and providing a metric quantify transition risk information may aid in protecting the value of a company's current investments.

Both the energy score (described above) and the T-Risk score (described below) of the present disclosure may be used by applying climate scenario analysis to estimate the adaptive capacity and climate resilience of publicly traded companies and their ability to maintain and grow profitability. In general, systems of the present disclosure may be configured to translate different climate scenarios and sector/regional-specific supply and demand elasticities and market dynamics such as production volumes, fuel costs, and capital expenditures (CAPEX) spending into drivers of financial performance tailored to each industry.

In some examples, the T-Risk metrics may be used for evaluating (without being limited to) equity securities (e.g., cash equities), fixed income securities (e.g., corporate bonds, convertible bonds) and/or fixed income derivatives (e.g., call and/or put options). For example, T-Risk metrics may be used with fixed income securities (together with climate scenario analysis) to estimate the capability of a company to maintain and grow its revenue and profitability indicators. The T-Risk metrics may allow a user to meaningfully adjust (for example) yields, credit spreads of fixed income issuances as well as the default likelihood of issuers and envision the impact of climate transition risk (along with traditional factors) on the user's investments.

In some examples, transition risk may represent a directional climate risk matrix providing information to improve financial and environment performance of a portfolio of securities (such as equity investment portfolios, fixed income investment portfolios, etc.). The transition risk may represent a matrix in that T-Risk metrics may indicate both climate sensitivity and a direction of the climate sensitivity. In some examples, the system may use climate scenario simulation to estimate the transition risk as a percentage decrease (or possibly increase) in profitability indicators between Business-As-Usual (BAU) scenario and a target transition risk scenario (e.g., for a particular company). In some examples, the transition risk for a company may be recalculated (e.g., on a periodic basis, based on one or more predetermined events and the like). In some examples, the transition risk may be normalized by one or more predetermined dimensions such as market cap, region, sector, style and the like.

In some examples, the transition risk may be configured to meet the definition of transition risk laid out by the Task Force on Climate-related Financial Disclosures (TCFD), in that the transition risk may indicate any reduction (or increase) in profitability associated with movement from a BAU scenario to a material and relatively rapid movement to a low carbon environment. In some examples, a confidence interval may be estimated for each transition risk estimate.

The energy scores (metrics) described above may be configured to determine a climate resiliency. For example, with better exposure to climate change risk, a user may be in a better position to cope with and/or handle physical and transition climate change risk. The energy scores may consider a minimum and maximum climate scenario and determine a variability of projected share price returns across scenarios. The energy scores are generally focused more on the magnitude rather than the direction of change in climate scenarios.

In contrast, transition metrics (described below) are generally focused more on climate alignments towards a predetermined scenario (goal), such as alignments towards 1.5-degree and/or 2.0-degree scenarios (e.g., scenarios representing temperature targets simulated using the global climate models achieved in a predetermined future date (e.g., 2100)). The transition risk metrics (scores) may consider both direction and magnitude. By having information on both magnitude and direction, the T-risk metrics may be used to evaluate which users may be ready for climate mitigation in terms of profitability and balance sheet indicators and how ready they may be relative to their peers in the same sectors and regions. In some examples, the transition risk may indication which investments and/or companies may better adapt to 1.5-degree and/or 2.0-degree climate scenarios. In general, climate resiliency (as provided by the energy scores described above) may be used to ensure adaption of firms with climate risk changes (e.g., good or bad, green or brown). Climate alignments (as provided by the transition risk described below) may evaluate a readiness of a user towards carbon mitigation and one or more predetermined goals (scenarios), such as the Paris climate goals of the Paris Agreement.

In some examples, the transition risk approach of the present disclosure may be focused more on climate mitigation rather than adaptation. The current conventional practices are "inside out" approaches, where data of different plans, businesses and supply chains is aggregated to gauge how companies are impacting the environment. In contrast, the T-Risk approach described herein is an "outside-in" approach. The "outside-in" approach uses science-based algorithms to detect climate alignments at company levels. This is computed by translating the information from climate models for low carbon scenarios in terms of future return projections in low carbon scenarios. In an "inside out" approach, an evaluation may looking into companies from their supply chain, business model, scope 1, 2 and 3 emissions, and the like, to collect data at an operation level and/or plant level and aggregate that data to form a metric. The "outside in" approach uses macro indicators such as (without being limited to) policy shocks, economic change, energy transitions, and evaluates how companies may adjust to these changes based on their historical relationship with energy sources.

There are several problems with the conventional "inside out" approach. These problems include biased data (e.g., self-reported data, analysts-based data and the like), limited data (e.g., a lack of regular reporting, gaps in the reporting and the like) and lack of data (e.g., because reporting may be voluntary) causing data to be unavailable for some sectors and/or regions. In addition, the "inside out" approach relies on assumptions on at least a portion of data rather than actual measurements (such as assumptions on historical behavior of a company, direction of changes, assumptions with its artificial intelligence (AI) approach, other assumptions). In contrast, the "outside in" approach, when applied at a portfolio and/or index level, show results that confirm climate outperformance. Moreover, the "outside in" approach does not depend on reporting and data aggregation, and can be very broadly applicable to multiple sectors and/or regions.

The transition risk system of the present disclosure solves several technical problems with technical solutions. The technical problems include lack of a suitable approach to convert climate models to climate alignment assessment for a broad range of asset classes that is sector and/or regionally inclusive, biases in the underlying data and/or inappropriate data that may produce inaccurate metrics, and a lack of backtesting capabilities. It is understood that an inability to identify and remove biases and/or inappropriate data is a technical problem that requires a technical solution. Any such errors in the underlying data may cause the climate risk prediction algorithm (including any climate models) to be inappropriately trained and generate inaccurate transition risk predictions. It is also understood that an inability of a climate risk predication algorithm to handle a broad range of data (e.g., multiple data classes such as asset classes) from a higher level in a hierarchy (e.g., at a sector level and/or a regional level versus at a security level) according to a unified approach is a technical problem. For example, the lack of a unified approach for a range of data classes/hierarchy may cause the processor of the system to repeatedly update (further develop) the algorithm for new data classes, may cause the algorithm to fail for new data that does not fit a predetermined (e.g., narrow) criterion (and cause the processor to halt the operation completely), may cause the memory of the system to store multiple (e.g., piecewise) algorithms depending on the data class and cause the processor to perform additional processing operations to identify the appropriate (piecewise) algorithm and perform the particular processing operations. Accordingly, the lack of a unified approach may cause an additional burden on the processor and memory components of the system. Yet further, the lack of backtesting capabilities is also a technical problem, because an inability to test and modify the performance of the algorithm may cause the algorithm to generate inaccurate results.

The technical solutions provided by the present disclosure include translating climate models in terms of company level climate alignment assessment, developing scientific, AI-based algorithms to ensure wide coverage of the transition risk across multiple asset classes (i.e., a unified approach), minimizing biases from self-reported company level data, identifying data representative of actual actions rather than potential commitments (thereby minimizing inappropriate data), minimizing greenwashing biases, developing techniques that are sector and regional inclusive and the developing of a backtesting capability.

To translate climate models in terms of company level climate alignment assessment (e.g., to public equities), the system of the present disclosure may use a standardized (unified) procedure across industry groups and regions, for example, based on mapping company level stock and performance to energy factors for the realized BAU scenario. Instead of a simple linear regression, the transition risk algorithm may use a Hierarchical Linear Model (HLM), which model can avoid single stock insignificant models, to construct the mapping. This mapping is not based on self-reported company level information. Rather, the mapping is focused on historical price dependency of company share price (adjusted) and energy factors carefully captured over a predetermined number of time periods (e.g., between 40 quarters and 60 quarters). Once the mapping is established, future stock returns may be projected for a predetermined time period (e.g., a two year forecast) of each company for multiple climate scenarios (e.g., carbon BAU, carbon Paris Aligned and the like).

The transition risk algorithm of the present disclosure includes a scientific AI-based algorithm to ensure wide coverage across asset class. For example, the algorithm may use common energy factors to ensure wide coverage. An Integrated Assessment Model (IAM) may simulate future price, supplier cost and demand for a number of energy sources (for example, nine energy sources including oil, gas, coal, biofuels, renewable fuel, renewable electric, hydroelectric, new technology and nuclear). In some examples, in order to explain most of the variances for a larger number (e.g., greater than 30) energy factors and reduce collinearity, the transition risk algorithm of the present disclosure may perform a principal components analysis (PCA) with varimax rotation and select a predetermined number (e.g., 5) of the most significant energy factors.

The transition risk algorithm of the present disclosure may also minimize any biases from self-reported company level data. In one example, to minimize biases the transition risk algorithm may provide a standardization of the computation processes and may use scientific statistical models that are rigorously back-tested.

The transition risk algorithm of the present disclosure may also use data that is based more on action rather than commitments (e.g., where the action data may be more relevant than commitments). For example, the algorithm may rank companies based on their price returns and other balance sheet indicators for a responsiveness to energy sources (e.g., both traditional and non-traditional energy sources). The algorithm may also determine forward looking projections of these indicators for both low carbon and BAU scenarios. Instead of looking into a company's commitments, announcements and reporting, the transition risk algorithm may determine how a company responds to energy markets currently and how the company will likely respond to multiple climate and energy scenarios in the future. This technique makes the transition risk approach more practical and action-based, as compared to other theoretical approaches. The transition risk algorithm of the present disclosure may also minimize greenwashing biases based on the data collected by the algorithm (e.g., action-based data). In general, greenwashing refers to disinformation disseminated by a company so as to present an environmentally responsible public image, such as large commitments towards sustainability but no real measurable action.

The transition risk algorithm of the present disclosure may also apply an approach that matures from divestment approaches to more sector and regional inclusive approaches. One example of a divestment approach includes leaving entire sectors such as energy and utility out of the investing portfolios. The divestment approach may be less computationally intensive, but is an incomplete and inaccurate approach for solving the problem of financing climate transitions.

The transition risk algorithm of the present disclosure may also provide backtesting capabilities: The backtesting capabilities may be used to evaluate data applications both in terms of financial returns and environmental outperformance.

To summarize, the transition risk algorithm of the present disclosure (described below) T-Risk may be concerned with climate mitigation. The algorithm may analyze a readiness of one or more companies to move towards predetermined goals (scenarios), such as NetZero goals or Paris Accord goals. The algorithm may consider transitions of companies from a current BAU scenario to a Paris Target (for example) scenario. The transition risk algorithm provides the ability to integrate the top-down climate modeling and scenario analysis (described above) together with bottom-up carbon emission data. The T-Risk score may provide a rating indication of companies based on where they are today (with respect to a BAU scenario) and how ready they are to drive towards NetZero goals (for example).

Figure 15:
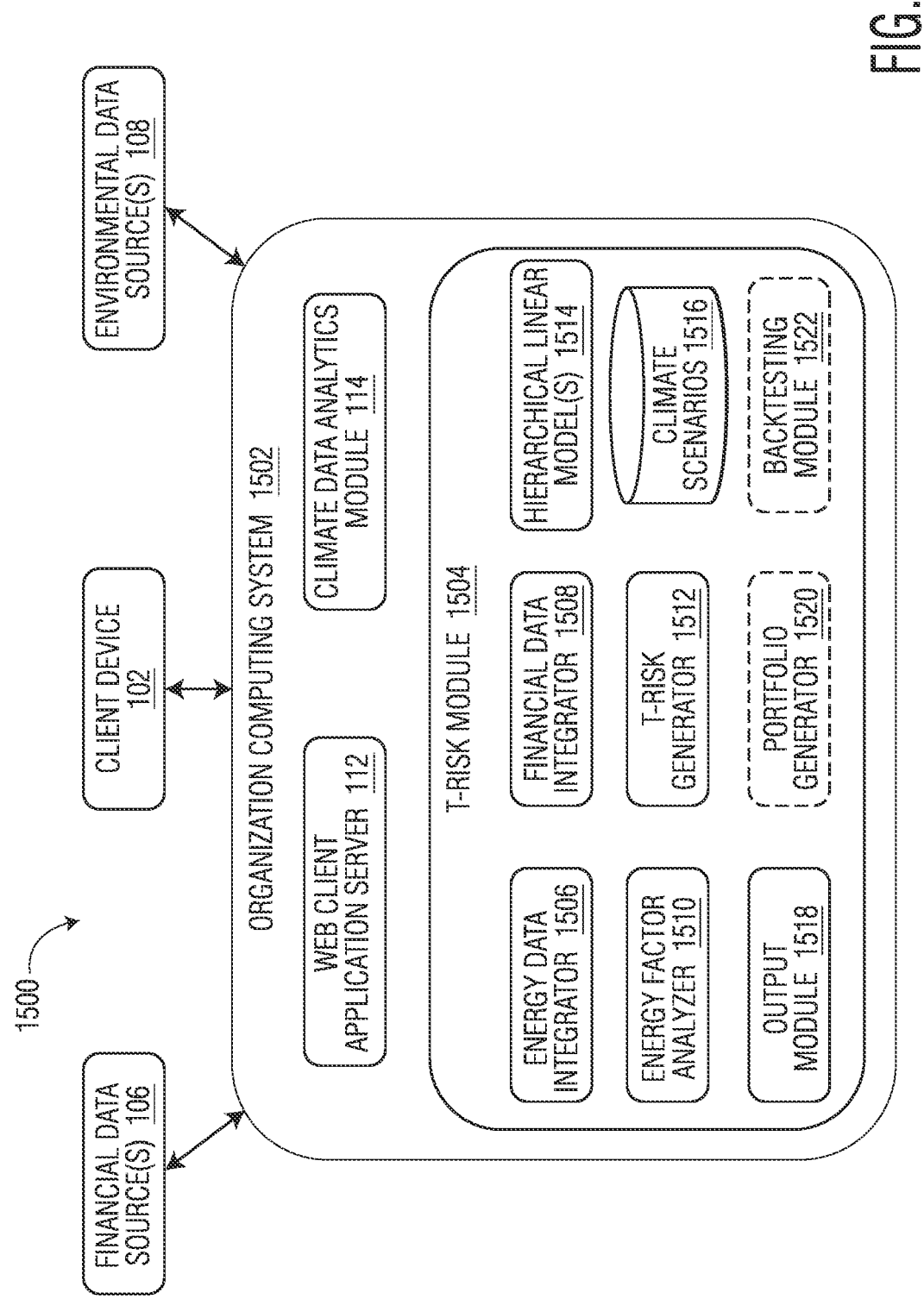
FIG. 15 is a functional block diagram illustrating a computing environment for climate data processing and impact predication, according to one exemplary embodiment.

FIG. 15 is a functional block diagram illustrating computing environment 1500 for climate data processing and impact predication. Computing environment 1500 is similar to computing environment 100 (FIG. 1), in that computing environment 1500 may include least one client device 102, financial data source(s) 106 and environmental data source(s) 108. Computing environment 1500 may also include organization computing system 1502. Organization computing system 1502 is similar to organization computing system 104 (FIG. 1) in that organization computing system 1502 may include web client application server 112 and climate data analytics module 114. Organization computing system 1502 is different from organization computing system 104 (FIG. 1), in that organization computing system 1502 may include transition risk (T-Risk) module 1502. Although not shown, components of computing environment 1500 may communication via at least one network (such as network 105 shown in FIG. 1).

T-risk module 1504 may include energy data integrator 1506, financial data integrator 1508, energy factor analyzer 1510, T-Risk generator 1512, one or more hierarchical linear models (HLMs) 1514, storage 1516, output module 1518, optional portfolio generator 1520 and optional backtesting module 1522. Each of energy data integrator 1506, financial data integrator 1508, energy factor analyzer 1510, T-Risk generator 1512, one or more hierarchical linear models (HLMs) 1514, output module 1518, optional portfolio generator 1520 and optional backtesting module 1522 may be comprised of one or more software modules. The one or more software modules may be collections of code or instructions stored on a media (e.g., memory of organization computing system 1504) that represent a series of machine instructions (e.g., program code) that implements one or more algorithmic steps. Such machine instructions may be the actual computer code a processor of organization computing system 1504 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Energy data integrator 1506 may be configured to receive energy-related data from among environmental data source(s) 108. In a non-limiting example, the energy-related data may include simulated future price, supplier cost and demand for a number of energy sources (e.g., oil, gas, coal, biofuels, renewable fuel, renewable electric, hydroelectric, new technology and nuclear). In general, the type of energy-related data may include any suitable type of energy data, and the number of energy sources may include one or more energy sources that, together, may be useful for determining a climate transition risk. Energy data integrator 1506 may be further configured to convert the received energy-related data into one or more energy returns (see eq. 7 below). The energy return data may be used (after further processing described below) for building HLMs 1514, as part of determining the transition risk. In some examples, the energy return data may include periodic returns that may be used (after further processing) to generate a training data set for HLMs 1514. Energy return(s) (rather than direct energy-related data) may be used so that this data is comparable with the dependent variables (stock return data). Thus, energy data integrator 1506 not only obtains energy (input) data, but also translates the input data so that it is compatible with stock return data (obtained by financial data integrator 1508). The energy return data determined by energy data integrator 1506 may be sent to energy factor analyzer 1510.

Financial data integrator 1508 (similar to financial data integrator 118 of FIG. 1) may be configured to retrieve financial data from among financial data source(s) 106. In some examples, the financial data may include historical stock return data associated with one or more financial securities. In some examples, the stock return data may include quarterly return data for one or more securities. In some examples, financial data integrator 1508 may use one or more factors for obtaining the financial data from among financial data source(s). Non-limiting factors that may be used include one or more of a price of extracted oil, a supplier cost to generate electricity using coal, a supplier cost to generate electricity using renewable energy, a demand for oil and/or any equivalent, a demand for gas and/or any equivalent, and the like. The financial data obtained by financial data integrator 1508 may be sent to T-Risk generator 1512.

Energy factor analyzer 1510 may be configured to identify one or more energy factors among the energy return data (received from energy data integrator 1506), based on principal component analysis (PCA). The identified energy factor(s) may then be sent, by energy factor analyzer 1510, to T-Risk generator 1512 and used by T-Risk generator 1512 to train HLMs 1514. In general, energy factor analyzer 1510 may be configured to identify energy factor(s) from the energy return data based on a correlation of an energy factor with principal components among the energy return data. To further reduce the number of factors determined via a factor analysis process, a factor with highest absolute correlation may be selected for each principal component. In some examples, the factor analysis process may include PCA with varimax rotation, to identify suitable energy factors to use for training HLMs 1514. The varimax rotation may be used, for example, to explain variances for a number of identified energy factors (e.g., greater than about 30), and may reduce collinearity. In some examples, energy factor analyzer 1510 may perform PCA with varimax rotation and select a predetermined number (e.g., 5) of energy factors among the energy factors (e.g., greater than 30) determined to be of a highest significance.

In a non-limiting example, the factor analysis process may include PCA with varimax rotation. Principal Component Analysis may be defined as an orthogonal linear transformation that transforms the energy return data to a new coordinate system such that the greatest variance by some scalar projection of the data comes to lie on the first coordinate (called the first principal component), the second greatest variance on the second coordinate, and so on. PCA guarantees that a largest variance is maintained with the fewest independent factors. Varimax rotation may be performed after the PCA so that principal components can be identified with actual energy factors having an explanatory power.

T-Risk generator 1512 may be configured to receive energy factor(s) from energy factor analyzer 1510 and historical stock return data from financial data integrator 1508. Based on the energy factor(s) and historical stock return data, T-Risk generator 1512 may train HLMs 1514, may predict future stock returns (via the trained HLMs 1514), and may generate one or more T-Risk scores for the predicted future returns based on multiple climate scenarios (e.g., using one or more parameters stored in storage 1516, such as Carbon BAU, Carbon Paris Aligned). In some examples, the T-Risk score(s) may be adjusted via one or more carbon emission parameters (stored for example in storage 1516). In a non-limiting example, T-Risk score(s) may also be scaled, such that a unit of output may indicate the number of universe interquartile ranges from a universe median. T-Risk generator 1512 is described further below with respect to FIG. 16.

HLMs 1514 may be configured to predict future stock returns for security(s) that take into account energy factor(s). HLMs 1514 may first be trained on historical stock return data (via financial data integrator 1508) with respect to the identified energy factor(s) (identified via energy factor analyzer 1510). The trained HLMs 1514 may then be used to predict future stock returns (in accordance with the energy factor(s)). use more training data which can reduce the variance of the coefficients' estimates.

The use of an HLM, rather than linear regression techniques, may provide advantages in cases of sparse data. For example, linear regression techniques may be unable to effectively handle cases where a single stock return may not have a significant model. In general, an HLM is a complex form of ordinary least squares (OLS) regression that may be used to analyze variance in outcome variables when the predictor variables are at varying hierarchical levels. Simple linear regression techniques may be insufficient for processing hierarchical data due to their neglect of the shared variance. In general, an HLM accounts for the shared variance in hierarchically structured data (e.g., lowest level 1 such as student level data, higher level 2 such as classroom data, etc.) to accurately estimate lower level slopes (e.g., lowest level 1) and their implementation in estimating higher-level outcomes (e.g., higher level 2, etc.). An HLM may simultaneously investigate relationships within and between hierarchical levels of grouped data, thereby making an HLM more efficient at accounting for variance among variables at different levels than other existing techniques. In some examples, HLMs 1514 may be configured as a 3-level HLM, where level 1 represents a stock (i) at time (t), level 2 represents stock (i) and level 3 represents industry group (j) (where i and j represent integers greater than or equal to 1 and where i may or may not be equal to j).

Figure 21:
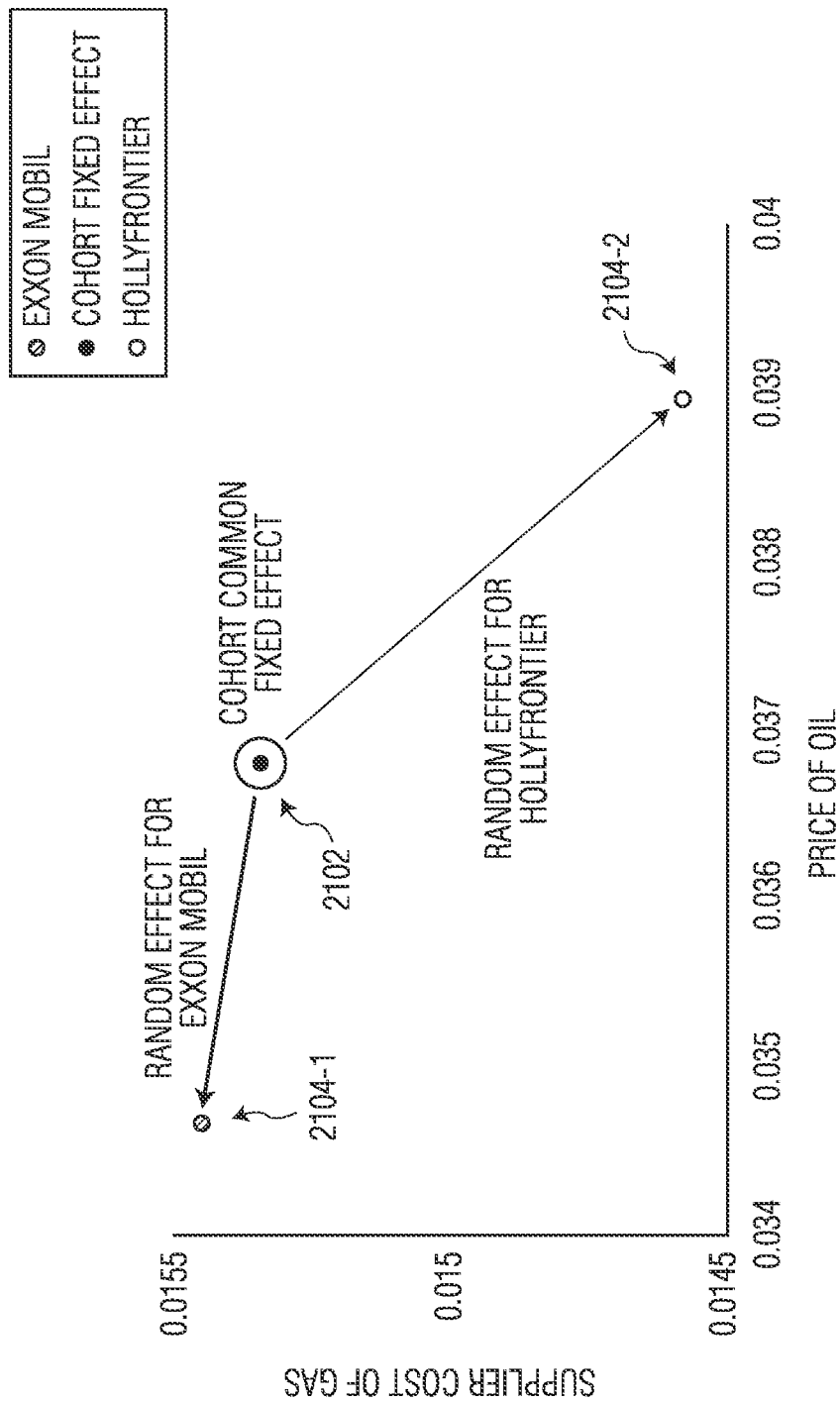
FIG. 21 is an example graph of regression coefficients of a hierarchical linear model for two entities with respect to a supplier cost of gas and a price of oil, according to an exemplary embodiment.

In general, HLM models 1514 of the present disclosure may include (a) one or more regression coefficients for various stocks (more specifically β coefficients, discussed further below) that represent a cohort common fixed effect for a stock and (b) one or more regression coefficients that represent a random effect of a stock on an industry group. For example, FIG. 21 illustrates an example graph of regression coefficients of a hierarchical linear model for two petroleum entities (e.g., Exxon Mobil and HollyFrontier) with respect to a supplier cost of gas and a price of oil, according to an exemplary embodiment. In this example, the combination of two petroleum entities represent an example industry group. In this example, both entities may include common cohort 2102 having a fixed effect for a stock. Each of the two entities may have their own separate random effect 2104-1, 2104-2 (e.g., due to their respective supplier cost for gas, price of oil and/or any combination thereof). In this example, the regression coefficients of the HLM model may include coefficient(s) based on cohort common fixed effect 2102 and separate coefficients based on random effects 2104-1 and 2104-2.

More specifically, a linear regression model is shown in eq. 1

$$Y_{tij} = \alpha_{ij} + \beta_{ij} * X_t + \varepsilon_{tij} \quad \text{(eq. 1)}$$

where: $Y_{tij}$ represents a dependent variable measured for an i-th stock within a j-th industry group at time t; $X_t$ represents a value on the level-1 predictor; $\alpha_{ij}$ represents an intercept for the stock j; $\beta_{ij}$ represents a regression coefficient for stock j; $\varepsilon_{tij}$ represents a random error associated with the i-th stock within j-th industry group at time t; $E(\varepsilon_{tij})=0$; $\text{var}(\varepsilon_{tij})=\delta^2$; and var represents a variance.

In level-2 models, the level-1 regression coefficients ($\alpha_{ij}$, $\beta_{ij}$) may be used as outcome variables and may be related to level-2 predictors. In the following example, the case of an intercept only model is utilized with the below equations:

$$\alpha_{ij} = \gamma_{oj} + r_{0ij} \quad \text{(eq. 2)}$$

$$\beta_{ij} = \gamma_{1j} + r_{1ij} \quad \text{(eq. 3)}$$

where: $\alpha_{ij}$ represents an intercept for an i-th stock in a j-th industry group; $\beta_{ij}$ represents a slope for an i-th stock in a j-th industry group; $\gamma_{oj}$ represents an overall intercept for an j-th industry group; $\gamma_{1j}$ represents an overall coefficient for a j-th industry group; $r_{0ij}$ represents a random effect of an i-th stock in a j-th industry group on the intercept; $r_{1ij}$ represents a random effect of an i-th stock in a j-th industry group on the slope; $E(r_{0ij})=0$; $E(r_{1ij})=0$; $\text{var}(r_{0ij})=\tau_{00}$; $\text{var}(r_{1ij})=\tau_{11}$; $\text{cov}(r_{0ij}, r_{1ij})=\tau_{01}$; and cov represents a covariance.

Eqs. 2 and 3 may be applied to eq. 1 to form a hierarchical linear model, shown in eq. 3 below:

$$Y_{tij} = \gamma_{oj} + r_{0ij} + (\gamma_{1j} + r_{1ij}) * X_t + \varepsilon_{tij}$$

$$= \gamma_{oj} + \gamma_{1j} * X_t + r_{0ij} + r_{1ij} * X_t + \varepsilon_{tij} \quad \text{(eq. 4)}$$

In eq. 4 the terms $\gamma_{oj} + \gamma_{1j}$ represent a the fixed effect and the terms $r_{0ij} + r_{1ij}$ represent the random effect. In eq. 4, it is assumed that:

$$\alpha_{ij} \sim N(\gamma_{0j}, \tau_{00}) \quad \text{(eq. 5)}$$

$$\beta_{ij} \sim N(\gamma_{1j}, \tau_{11}) \quad \text{(eq. 6)}$$

Eq. 1 represents a (regular) linear regression for each stock, which may be solved using a maximum likelihood estimator, and where $\alpha$ and $\beta$ are handled as constants. Eq. 4 represents a hierarchy linear regression. In some examples, eq. 4 may be solved using a Bayesian estimator, where $\alpha$ and $\beta$ may be considered to be random and where the prior distribution of $\alpha$, $\beta$ may be estimated using eqs. 3 and 4. In general, estimates obtained from a linear regression in the stock level (eq. 1) may be different from estimates obtained from a hierarchical linear model (eq. 4). Estimates obtained from the hierarchical linear model (eq. 4) may be closer to group means.

Storage 1516 may be configured to store one or more parameters associated with one or more climate scenarios, such as, without being limited to, a Carbon BAU scenario, a 1.5-degree scenario, a 2.0-degree scenario and the like. In general the climate scenario parameters may be associated with any desired climate scenario, associated with one or more predetermined goals (such as a Carbon reduction goal) certain carbon goals or targets (e.g., goals established by UNFCCC), IPCC, and the like). Storage 1516 may also be configured to store one or more carbon emission parameters. In some examples, storage 1516 may also be configured to store one or more parameters associated with one or more of energy data integrator 1506, financial data integrator 1508, energy factor analyzer, T-Risk generator 1512, HLMs 1514, output module 1518, optional portfolio generator 1520 and optional backtesting module 1522.

Output module 1518 may be configured to provide transition risk scoring based on the results of T-Risk generator 1512. In some examples, the T-Risk score(s) may be part of one or more metrics associated with the transition risk, as well as (in some examples), additional metric associated with the energy metrics discussed above with respect to FIG. 1, as well as any other suitable environmental and/or financial metrics. As discussed above, the T-Risk score(s) may provide a quantitative and objective means for measuring an alignment to a given climate change scenario, such as a relative alignment of a portfolio to certain carbon goals. The T-Risk score(s) may provide information to indicate both a climate sensitivity and a direction of the climate sensitivity for predicted future returns of security(s) with respect to a climate change scenario (such as a transition to a reduced carbon scenario). In some examples, the T-Risk metric(s) provided by output module 1518 may be used (e.g., via client device 102) to adjust various energy and/or financial characteristics and review an impact of such adjustments on the T-risk metrics(s), to improve a financial and environment performance of a portfolio of securities.

In some embodiments, output module 1518 (similar to output module 122 of FIG. 1) may produce a website, accessible by one or more users via application 110 (FIG. 1) executing on client device 102. The website may provide a dashboard that allows users to view results generated by T-Risk generator 1512, and/or optional portfolio generator 1520. In some embodiments, output module 1518 may generate one or more data files for electronic transfer to client device 102.

Optional portfolio generator 1520 may be configured to use the results from T-Risk generator 1512 to project a portfolio performance relative to multiple climate scenarios. Portfolio generator 1520 may optimize the portfolio based on the selected climate scenarios, and the transition risk scores and/or metric(s) associated with the selected scenarios. In some examples, a user, via output module 1518 may be configured to interact with portfolio generator 1520, such as to adjust energy and/or financial characteristics. Portfolio generator 1520 may update the projected portfolio based on the adjusted characteristics and transition risk metric(s).

Optional backtesting module 1522 may be configured to perform one or more backtesting operations to test a performance of HLMs 1514 and T-Risk generator 1512, and to adjust (if needed) parameters of HLMs 1514 and/or T-Risk generator 1512 responsive to the backtesting. In some examples, HLMs 1514 may be trained using historical data with different times of departure, and one or more historical T-Risk scores may be determined (i.e., T-risk score(s) may be determined from historical return data rather than future predicted return data). The historical T-Risk score(s) may be used to construct one or more climate-friendly portfolios. The historical financial performance and carbon performance of the climate-friendly portfolio(s) may be compared with one or more benchmark values to determine whether the portfolio(s) outperformance or underperforms the benchmark value(s). Responsive to the benchmark comparison, one or more parameters of HLMs 1514 and/or T-Risk generator 1512 may be updated, in order to improve the financial and/or carbon performance of the portfolio. In some examples, backtesting module 1522 may perform backtesting periodically and/or in response to one or more predetermined events (e.g., a new climate goal, a predetermined change in the historical financial data, responsive to user input, and the like).

Figure 16:
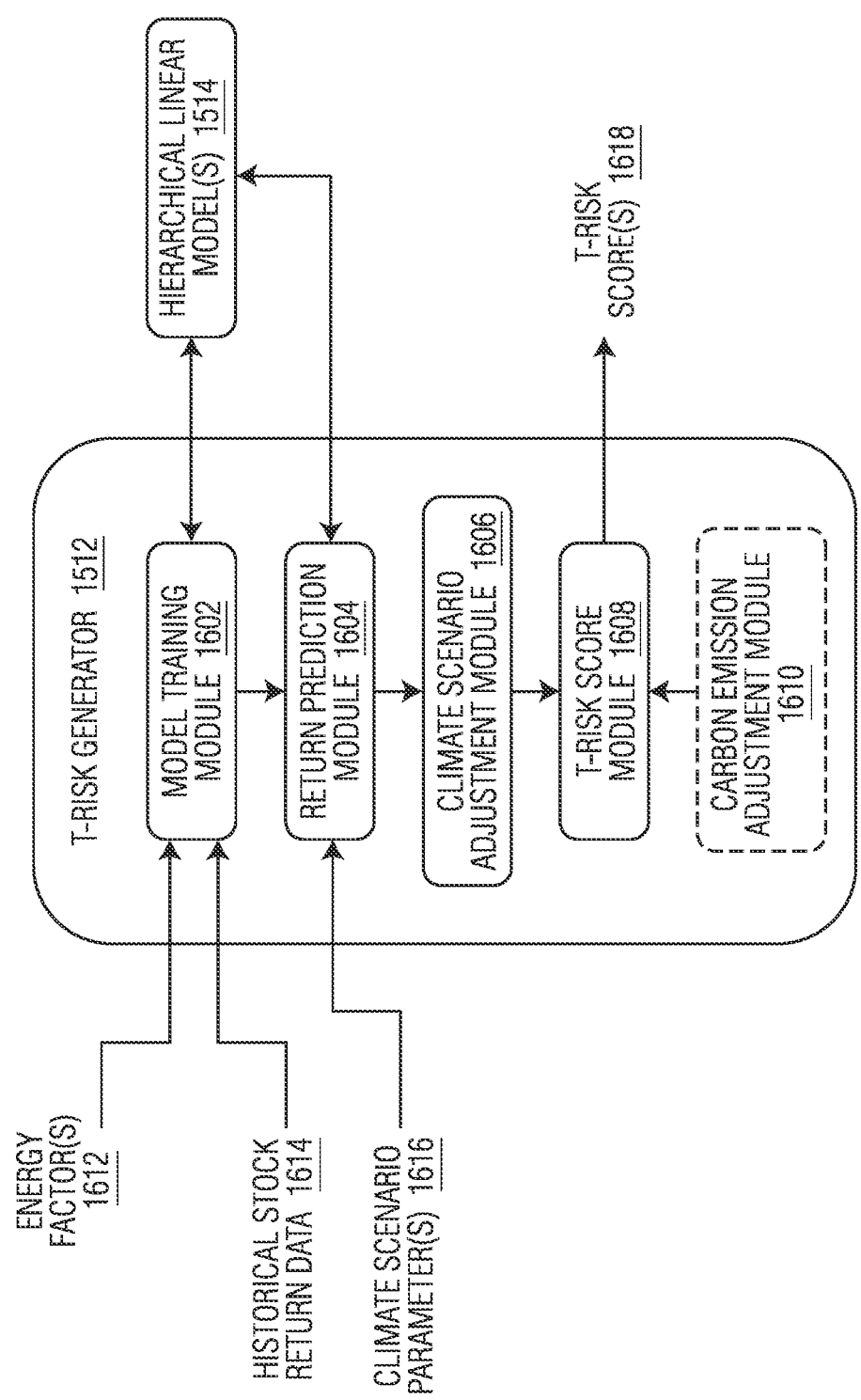
FIG. 16 is a functional block diagram illustrating an example transition risk generator of a climate data processing and impact prediction system shown in FIG. 15, according to one exemplary embodiment.

FIG. 16 is a functional block diagram illustrating example T-Risk generator 1504. T-Risk generator 1504 may include model training module 1602, return prediction module 1604, climate scenario adjustment module 1606, T-Risk score module 1608 and, in some examples, optional carbon emission adjustment module 1610. Each of model training module 1602, return prediction module 1604, climate scenario adjustment module 1606, T-Risk score module 1608 and optional carbon emission adjustment module 1610 may be comprised of one or more software modules. The one or more software modules may be collections of code or instructions stored on a media (e.g., memory of organization computing system 1504) that represent a series of machine instructions (e.g., program code) that implements one or more algorithmic steps. Such machine instructions may be the actual computer code a processor of organization computing system 1504 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Model training module 1602 may be configured to receive one or more energy factor(s) 1612 (e.g., from energy factor analyzer 1510) and historical stock return data 1614 (e.g., from financial data integrator 1508) associated one or more securities, and may be configured to train HLMs 1514. In some examples, model training module 1602 may be configured to perform one or more groupings of historical stock return data 1614 into one or more hierarchies, such as by sector and/or by industry, prior to applying historical stock return data 1614 to HLMs 1514. For example, an industry group may be used as cohorts to group stock return data 1614 for training of HLMs 1514. In some examples, when there are not enough historical stock returns inside a specific region (e.g., sparse data), model training module 1602 may be configured to go up a level, such as by grouping using sector as a cohort instead of by industry group. Model training module 602 may be configured to train HLMs 1514 by regressing (grouped) historical stock return data 1614 on energy factor(s) 1612 for at least one predefined past period (for example, see eq. 8).

Return prediction module 1604 may be configured to predict (e.g., project) one or more future stock returns for one or more future periods via HLMs 1514 (as trained by model training module 1602). In some examples, future stock returns may be predicted and accumulated for a predetermined number of future quarters (e.g., for the next 8 quarters) or any suitable future period of time. In some examples, return prediction module 1604 may predict future stock returns based on one or more climate scenario parameters 1616 (e.g., stored in storage 1516). In some examples, climate scenario parameters 1616 may include one or more predictions of one or more energy factors under different scenarios.

Climate scenario adjustment module 1606 may be configured to receive the future stock returns (from return prediction module 1604 and may adjust the future stock returns (over the future period(s)) for at least two (or more) climate scenarios. In some examples, the adjustment of the future stock returns for climate scenarios may be determined via one or more corresponding climate scenario parameters 1616 (e.g., stored in storage 1516). For example, climate scenario adjustment module 1606 may adjust the future stock returns based on a Carbon BAU scenario (e.g., a current carbon scenario) to form first adjusted future returns, and may also adjust the future stock returns based on a carbon-reduced scenario (e.g., a Carbon Paris Aligned scenario such as a 1.5-degree scenario, a 2.0-degree scenario) to form second adjusted future returns.

T-risk score module 1608 may be configured to determine one or more T-Risk scores 1618 based on the adjusted future stock returns for multiple climate scenarios (received from climate scenario adjustment module 1606. More specifically, T-risk score module 1608 may determine T-Risk score(s) for the future period(s) based on a spread between the first adjusted returns (e.g., for a current carbon scenario) and the second adjusted returns (e.g., a carbon-reduced scenario), as shown in eq. 10 below. In some examples, multiple T-risk scores may be determined, for example, based on a spread between a current carbon scenario and two or more carbon-reduced scenarios (e.g., a 1.5-degree scenario and a 2.0-degree scenario). In some examples, T-Risk score(s) 1618 may be scaled by one or more predetermined values. In a non-limiting example, T-Risk score(s) 1618 may be scaled such that a unit of output indicates a number of universe interquartile ranges from a universe median. In another non-limiting example, the scaling may include a standard normalization scaling. In some examples, no scaling may be applied to T-Risk score(s) 1618 (e.g., so that T-Risk score(s) 1618 may indicate an (actual) predicted return reduction from BAU to a carbon-reduced scenario such as a Paris-Aligned scenario).

Optional carbon emission adjustment module 1610 may be configured to adjust the T-Risk score (determined by T-Risk score module 1608 by a predetermined carbon emission adjustment (see eq. 11). In some examples, the carbon emission adjustment may improve both the predicted financial and carbon emission performance for the future stock returns. In some examples, T-Risk score(s) 1618 may include the carbon emission (as adjusted by carbon emission adjustment module 1610).

Figure 17:
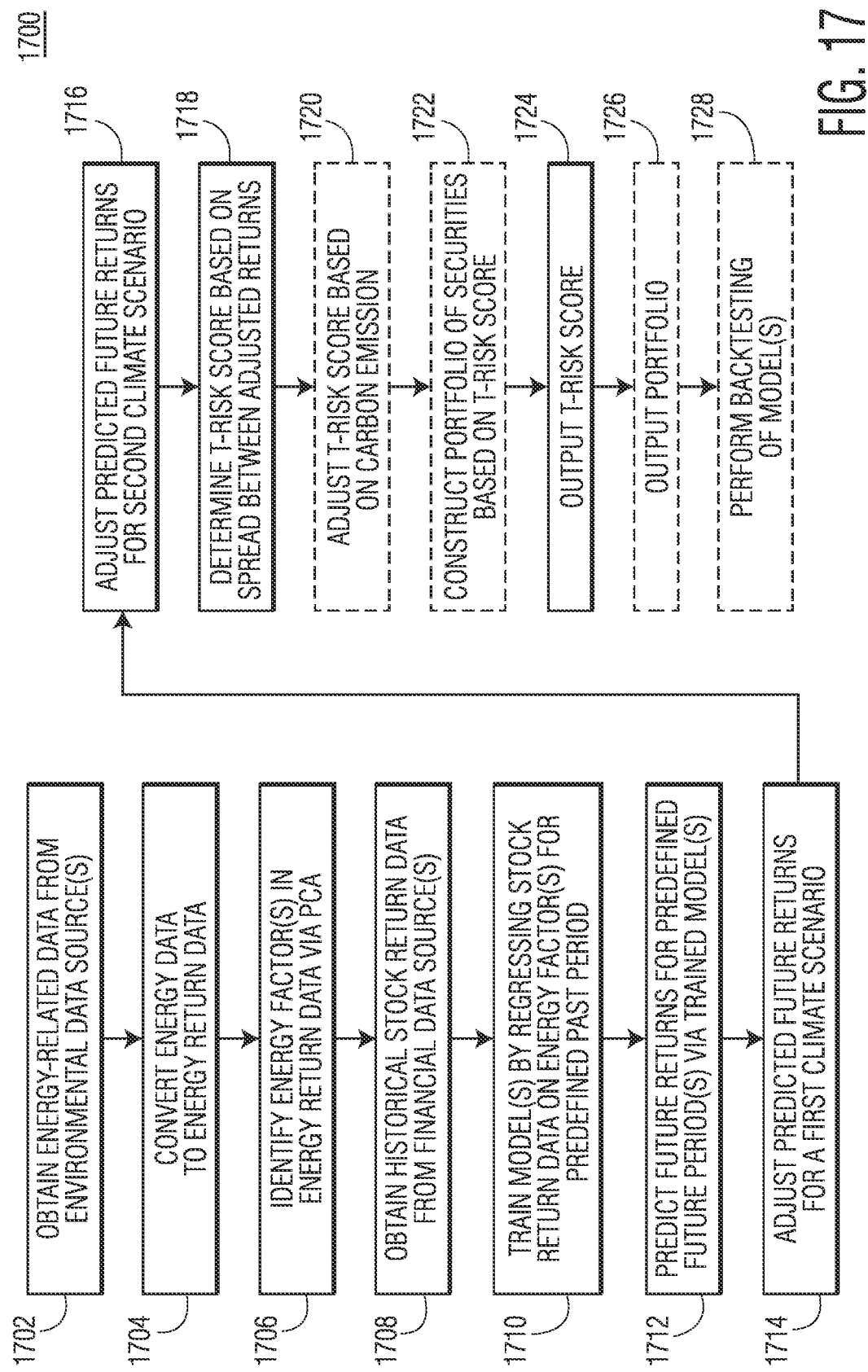
FIG. 17 is flow diagram illustrating a method of transition risk predication, according to one exemplary embodiment.
Figure 18:
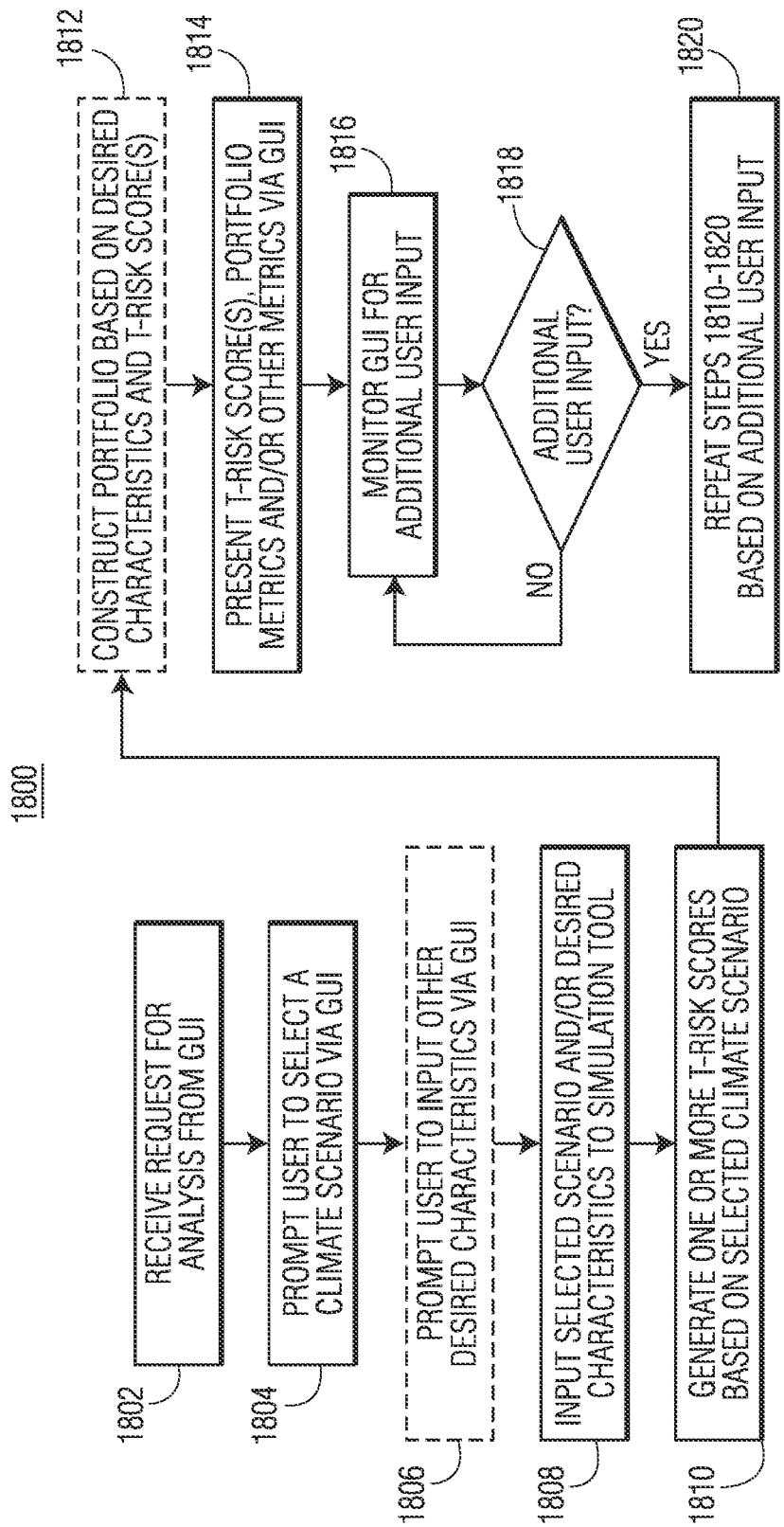
FIG. 18 is a flow diagram illustrating a method of generating user-customizable transition risk prediction information via an interactive graphical user interface, according to one exemplary embodiment.

Those skilled in the art will appreciate that organization computing system 1502 may be configured with more or less modules to conduct the methods described herein with reference to FIGS. 17 and 18.

As illustrated in FIGS. 17 and 18, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 17 and 18 may be performed by one or more specialized processing components associated with T-Risk module 1504 of organization computing system 1502 of FIG. 15 and T-Risk generator 1512 shown in FIG. 16.

FIG. 17 is flow diagram illustrating example method 1700 of determining a climate transition risk as part of climate data processing and climate impact prediction. At step 1702, energy-related data may be obtained, by energy data integrator 1506 from among environmental data source(s) 108. At step 1704, the energy related data may be converted, by energy data integrator 1506, into energy return data. Eq. 7 below illustrates an example conversion of energy-related data to energy return data for oil fuel price data that may be extracted from among environmental data source(s) 108. A similar equation may be used to convert other energy-related data to energy return data. In eq. 1, t represents time.

$$r_{extracted\_fuel\_price\_oil} = \frac{\text{extracted\_fuel\_price\_oil}[t+1]}{\text{extracted\_fuel\_price\_oil}[t]} - 1 \quad \text{(eq. 7)}$$

At step 1706, one or more energy factors may be identified, by energy factor analyzer 1510, based on PCA. In some examples, the PCA process may include varimax rotation, in order to avoid any multicollinearity. In a non-limiting example, an initial set of greater than 30 energy factors may be determined (e.g., including price, supplier cost, unit profit, etc.), and the energy factors may be reduced to a predetermined number (e.g., 5) determined to be of a highest significance. In one examples, 5 major energy factors may be determined which can explain around 80% of the variances.

At step 1708, historical stock return data may be obtained, by financial data integrator 1508, from among financial data source(s) 106, for one or more predefined past periods of time.

At step 1710, HLMs 1514 may be trained, by model training module 1602 of T-Risk generator 1504, by regressing periodic stock return data on the identified energy factors (step 1706) for a predefined past period (e.g., an N number of quarters) using HLMs 1514. In some examples, step 1710 may include training HLM model(s) 1514 by determining cohort common fixed effects and any random effects associated for each entity by regressing stock return data on energy factor(s) for the predefined past period. In some examples, N=max(min(n,60),40), where n is the length of available history. An example regression of stock regression of stock return data on energy factors ($F_1$-$F_5$) is shown in eq. 8 below. In eq. 8, $F_1$-$F_5$ represents energy factors associated with an extracted price of fuel oil ($F_1$), a supplier cost of fuel with respect to gas ($F_2$), a market price of electricity ($F_3$), a primary energy equivalent to bioenergy ($F_4$) and a total energy demand ($F_5$). In eq. 8, α represents an intercept and $β_i$ (where i=1-5) represents a sensitivity of stock returns to the respective energy factor returns. The variable α represents a stock return drift which may not be influenced by energy factors.

$$r_{stock} = α + β_1 * F_1 + β_2 * F_2 + β_3 * F_3 + β_4 * F_4 + β_5 * F_5 \quad \text{(eq. 8)}$$

At step 1712, future stock returns may be predicted, by return prediction module 1604, for one or more predefined future period(s) via the trained HLMs 1514. In some examples, predicted returns may be accumulate for the next 8 quarters.

The T-Risk algorithm, described herein is different from the energy score described above in that the T-Risk score does not rely on profitability indicators. An HLM was tested based profitability indicators, however improved efficacy results were obtained when energy-related data was used for training (rather than profitability indicators).

As part of the model training, a beta estimation (vâr($\hat{β}_j$) shown in eq. 9) is performed, and may provide an indication of efficacy of the model (as trained). In general, the beta estimations may be more stable with increasing training data points. Moreover, an insignificant beta estimation with large variance may make predictions untrustworthy. Ins some examples, In fact, 60 quarters of past periods show greater efficacy than 40 past quarters. In eq. 9, the term $s^2$ represents a variance of error, the variable n represents a number of training data, the term vâr($X_j$) represents a variance of the jth independent variable and the remaining term $$\frac{1}{1-R_j^2}$$

represents a variance inflation.

$$vâr(\hat{β}_j) = \frac{s^2}{(n-1)vâr(X_j)} * \frac{1}{1-R_j^2} \quad \text{(eq. 9)}$$

At step 1714, the predicted future returns (for the predefined future period(s)) may be adjusted, by climate scenario adjustment module 1606, for a first climate scenario, such as a BAU scenario (e.g., 4.2° C. scenario). At step 1716, the predicted future returns (for the predefined future period(s)) may be adjusted, by climate scenario adjustment module 1606, for a second climate scenario, such as a reduced carbon scenario (e.g., a Ratchet (e.g., 1.32° C.) scenario).

At 1718, at least one T-Risk score may be determined, by T-Risk score module 1608, based on a spread between the adjusted future returns for the first and second climate scenarios (determined at steps 1714 and 1716). An example determination of a T-Risk score based on BAU and Ratchet scenarios is shown in eq. 10.

$$T\text{-Risk} = r_{bau}[n] - r_{1.32}[n], \quad \text{(eq. 10)}$$

where r_bau is the cumulative return under BAU scenario, r_1.32 is the cumulative return under Ratchet scenario and n is the last predicted quarter. In current case, it's the 8th quarter from now.

At optional step 1720, the T-Risk score (determined at step 1718) may be adjusted, by optional carbon emission adjustment module 1610, based on a predetermined carbon emission adjustment. An adjustment for carbon emission is shown in eq. 11.

$$T\text{-Risk-Carbon-Adjusted} = \tfrac{1}{2} * T\text{-Risk-Scaled} + \tfrac{1}{2} * \text{Carbon-Footprint-Scaled} \quad \text{(eq. 11)}$$

At optional step 1722, a portfolio of securities may be constructed, by optional portfolio generator 1520, based on the T-Risk score (including in some examples, any adjustments to the T-Risk score based on a carbon emission adjustment in optional step 1720). In some examples, a portfolio may be constructed by selecting stocks with better T-Risk scores (e.g., a top 25%).

In some examples, a proposed portfolio may be constructed, and the proposed portfolio may be subject to one or more predetermined efficacy conditions. For example, a financial performance of the proposed portfolio may be compared to a benchmark (or a parent security), to confirm that the proposed portfolio outperforms the benchmark (or parent security). In addition, a carbon performance of the proposed portfolio may be determined, to confirm that the proposed portfolio has a reduced carbon footprint compared to the benchmark (or parent security). In some examples, the proposed portfolio may also be analyzed for sector weight allocation, such that the allocation is within a predetermined threshold of the benchmark allocation (or parent security allocation). In some examples, the proposed portfolio may be output upon meeting the predetermined efficacy condition(s).

At step 1724, the T-Risk score may be output, for example, by output module 1518, to client device 102. At optional step 1726, the constructed portfolio may be output, for example, by output, to client device 102. At optional step 1726, optional backtesting module 1522 may perform backtesting of HLMs 1514 and, in some examples, may adjust parameter(s) of HLMs 1514 and/or T-Risk generator 1512 based on the backtesting.

Figure 19A:
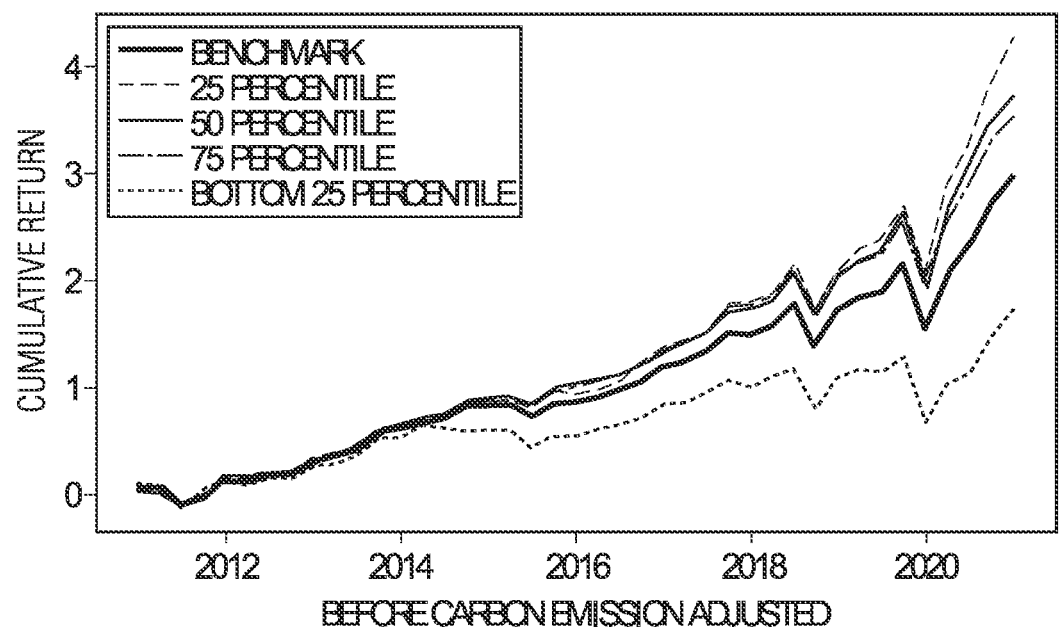
FIGS. 19A and 19B are example graphs of cumulative returns before and after carbon emission is adjusted, respectively, according to one exemplary embodiment.

Referring to FIGS. 19A-20D, examples of a performance of T-Risk predictions are shown. In particular, FIGS. 19A and 19B are example graphs of cumulative returns before and after carbon emission is adjusted; and FIGS. 20A-2D are example graphs of cumulative returns as a function of date for various rebalancing operations (with respect to rebalancing quarterly, every year, every 2 years and every 3 years, respectively).

Figure 19B:
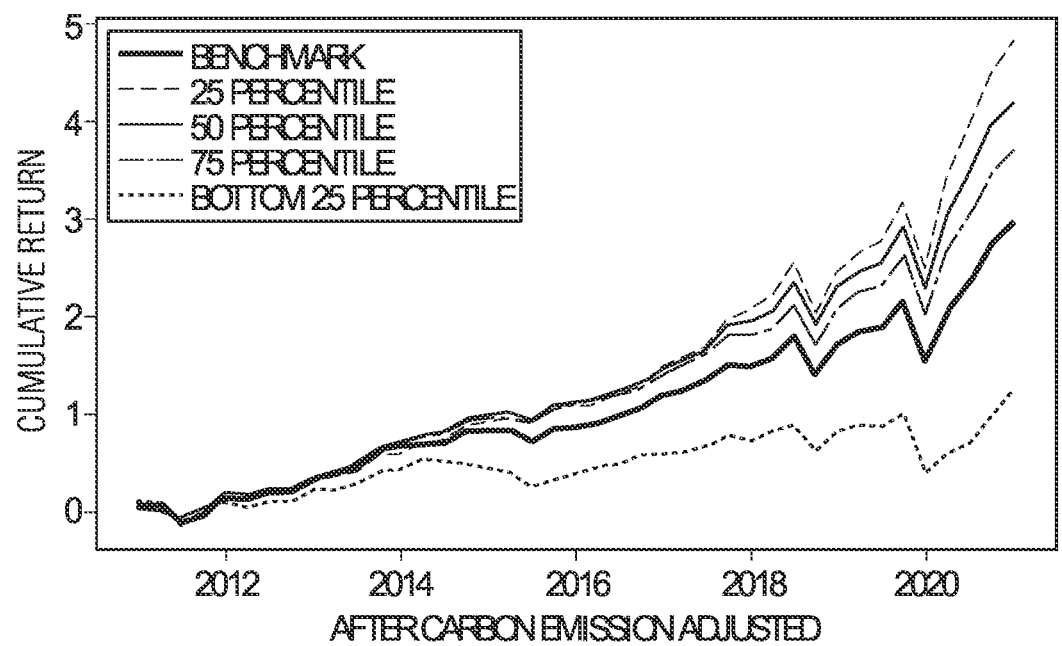
Figure 20A:
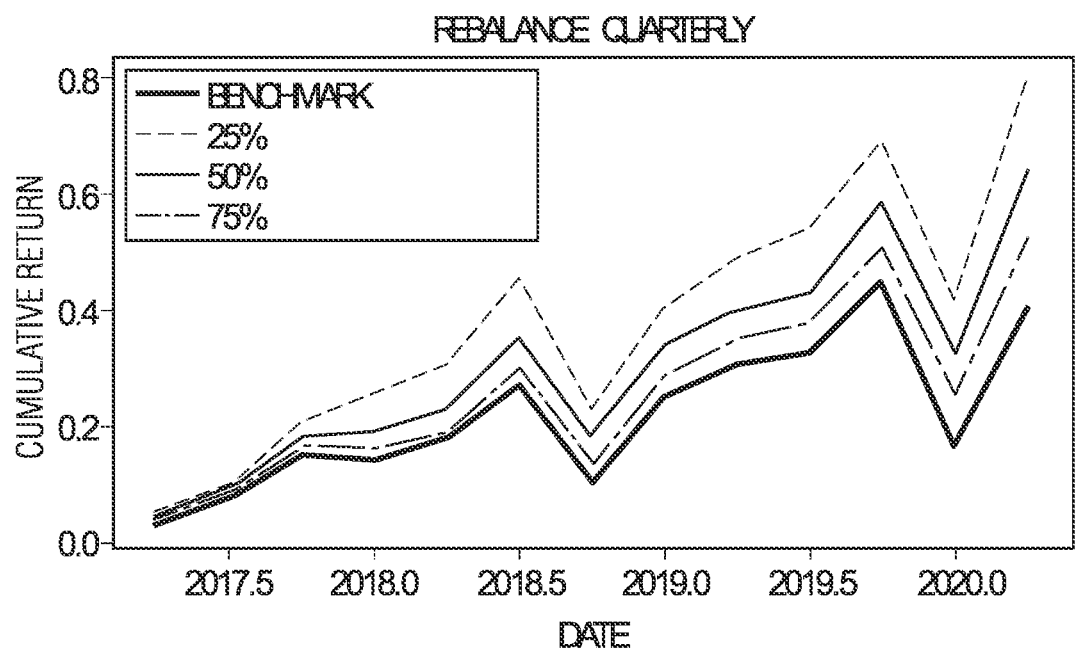
FIGS. 20A, 20B, 20C and 20D are example graphs of cumulative returns as a function of date for various rebalancing operations, according to one example embodiment.
Figure 20B:
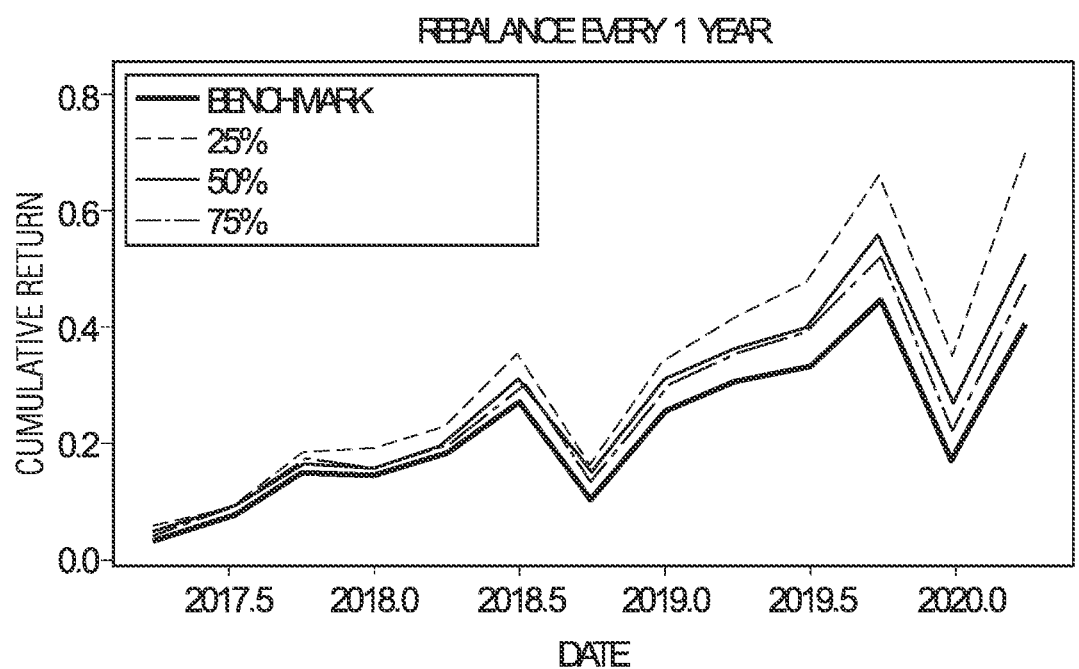
Figure 20C:
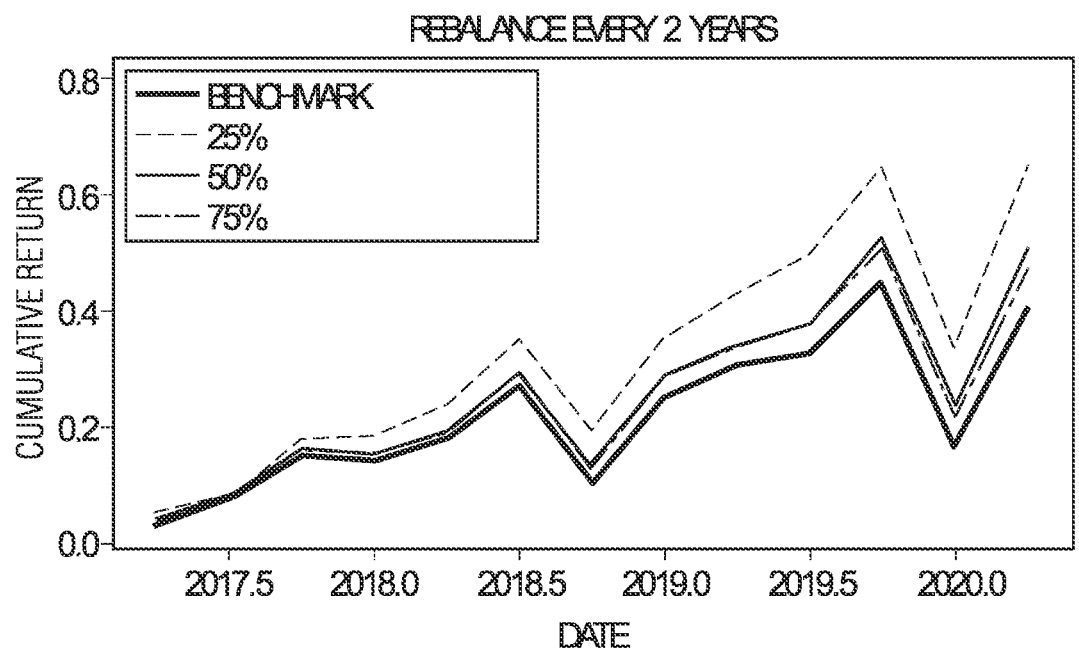
Figure 20D:
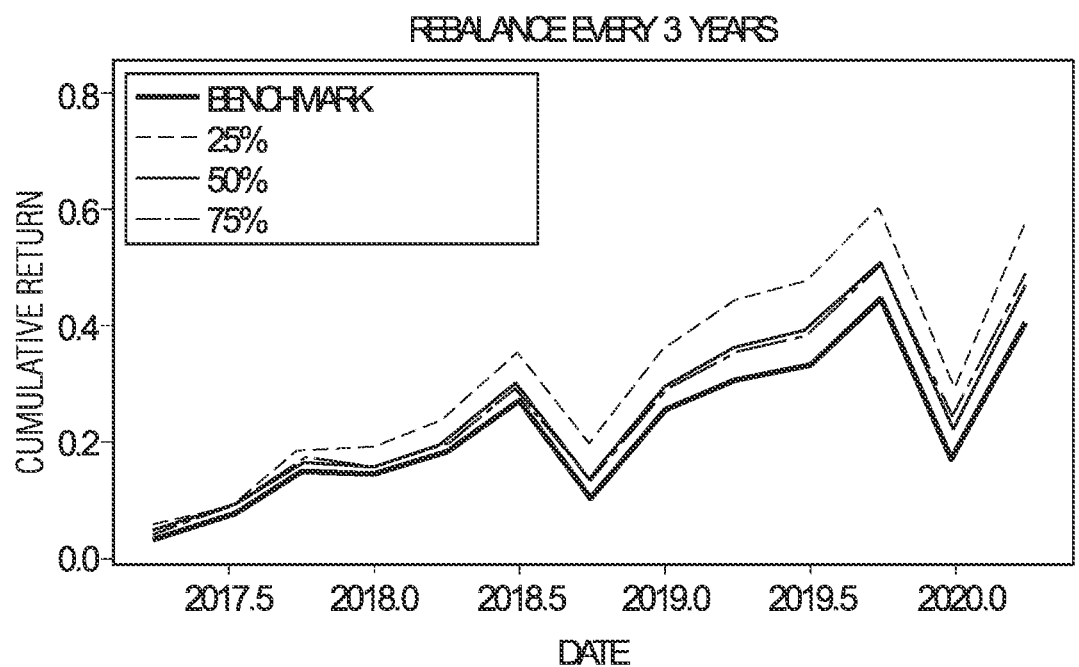

In some examples, carbon adjustments may not only improve a financial performance, but may also improve the carbon emission performance. As shown in FIG. 19A, the use of a T-Risk score alone shows already shows financial and carbon outperformances (with respect to the benchmark). As shown in FIG. 19B, adding a carbon emission adjustment to the T-Risk score may improve both financial and carbon outperformance (with respect to the benchmark). In some examples, adding a T-risk score to carbon emission may make large a financial outperformance more stable. In general, as shown in FIGS. 19A-20D, a portfolio constructed using the T-risk score may include large financial outperformance compared with a benchmark or its parent security (e.g., an exchange traded fund (ETF)). Moreover, adding carbon emission information to the T-Risk score may help to significantly reduce the carbon footprint for a constructed portfolio.

FIG. 18 is a flow diagram illustrating example method 1800 of generating user-customizable transition risk prediction information via an interactive graphical user interface (GUI), such as the GUIs described above. At step 1802, organization computing system 1502 may receive a request for transition risk analysis from an interactive GUI generated (or rendered) by client device 102. At step 1804, the GUI may prompt the user to select a climate scenario (e.g., a reduced carbon scenario). At optional step 1806, the GUI may prompt the user to input one or more other desired characteristics (such as desired financial characteristics, desired environmental characteristics, desired entity characteristics, desired security characteristics and the like).

At step 1808, the selected scenario (and any other desired characteristics) may be input to a simulation tool represented by T-Risk module 1504. At step 1810, one or more T-risk scores (e.g., a T-risk score without carbon emission adjustment, a T-risk score with carbon adjustment, multiple T-risk scores for different reduced carbon scenarios, etc.) may be generated by T-Risk module 1504, based on the selected climate scenario (e.g., according to method 1700 shown in FIG. 17). At optional step 1812, a portfolio may be constructed, by optional portfolio generator 1520, based on the T-Risk score(s) and (in some examples) other desired characteristics (obtained at step 1808).

At step 1814, one or more of the T-Risk score(s), portfolio metrics (if a portfolio is constructed in optional step 1812) and (in some examples) other suitable metrics (for example, metrics related to the T-risk score(s), metrics related to an energy score, other information on financial and/or environmental characteristics and the like) may be presented to client device 102, by output module 1518, via the GUI.

At step 1816, organization computing system 1502 may monitor the GUI to determine whether additional user input is received. At step 1818, it is determined whether additional user input is received. When additional user input is received, step 1818 proceeds to step 1820, and steps 1810-1820 may be repeated. When no additional user input is received, step 1818 proceeds to step 1816, and organization computing system 1502 may continue to monitor for additional user input. In this manner, system 1502 may adjust the results presented at step 1814 depending on any user input updates.

The technique for generating T-risk scores (by T-risk module 1504 of organization computing system 1502) is different from the energy scores determined by system 104 of FIG. 1. One difference is with respect to climate scenario. The T-Risk technique measures a return spread from BAU scenario to a lower carbon scenario (such as a Paris Aligned scenario (~1.32 degree C.)). In addition provides an relative value metric as opposed to an absolute value metric. This is because the T-Risk score represents a difference between BAU and reduced carbon scenarios without rescaling by the BAU scenario.

In addition, the energy score represents a scalar whereas the T-Risk score represent a vector. This is because the T-Risk score is a directional climate matrix which indicates not only a climate sensitivity but also the sensitivity direction. Another difference is that the T-Risk score uses energy-related data (directly) whereas the energy score uses profitability indicators as part of their respective processing techniques.

In some examples, the T-Risk technique may use a more detailed classification to group stocks compared with the energy score technique. One further difference from the energy scores is that the T-Risk technique uses a hierarchical linear model with industry and region grouping vs Linear Model.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system, comprising:
a processor; and
a memory having programming instructions stored thereon, which, when executed by the processor, causes the processor to perform an operation, comprising:
receiving, via at least one network, a user selection of a climate change scenario from a remote client device;
retrieving, over the at least one network, energy data from among one or more energy sources, the energy data comprising one or more of simulated future price data, supplier cost data and demand data for the one or more energy sources;
identifying a predetermined number of energy factors according to a principal component analysis (PCA) of the retrieved energy data, based on a correlation of the predetermined number of energy factors with principal components among the retrieved energy data;
retrieving, over the at least one network, historical financial information directed to one or more securities from one or more remote financial data sources;
predicting one or more future returns for the one or more securities, through a simulation of a climate change impact of the one or more energy sources, by applying the historical financial data and the predetermined number of energy factors to at least one hierarchical linear model (HLM), the at least one HLM configured to predict how the one or more remote financial data sources respond to multiple future climate scenarios based on measurable action data among the historical financial data, the measurable action data indicative of a responsiveness of the one or more remote financial data sources to current energy market data, thereby minimizing one or more self-reporting biases among the one or more remote financial data sources;
adjusting the predicted one or more future returns based on a first climate scenario and the selected climate scenario, to form respective first adjusted returns and second adjusted returns;
generating a climate transition risk for the one or more securities based on a spread between the first adjusted returns and the second adjusted returns, the climate transition risk is a metric based on a correlation between the one or more securities and climate sensitivity and indicates an amplitude and direction of the climate sensitivity on a given portfolio of investments including the one or more securities, the climate sensitivity indicating financial effects caused by a transition to the selected climate scenario on the given portfolio of investments including the one or more securities;
providing a data set representing the climate transition risk to the remote client device, the data set including one or more metrics for evaluation of the climate sensitivity of the given portfolio of investments;
responsive to the data set provided to the remote client device, receiving, by the processor, additional user input indicative of an adjustment of the climate sensitivity associated with the evaluation of the one or more metrics; and
adjusting, by the processor, the climate sensitivity by adjusting the one or more metrics provided to the remote client device, in accordance with the additional user input received.

2. The system of claim 1, wherein the processor is further configured to perform an operation comprising:
converting the energy data to energy return data, such that the energy return data is compatible with the one or more securities,
wherein the processor is configured to identify the predetermined number of energy factors from the energy return data.

3. The system of claim 2, wherein the predetermined number of energy factors are identified from the energy return data based on the principal component analysis.

4. The system of claim 1, wherein the processor is further configured to perform an operation comprising:
training the at least one HLM by regressing the historical financial information on the predetermined number of energy factors for at least one predefined past period.

5. The system of claim 1, wherein the first climate scenario includes a business as usual (BAU) scenario and the selected climate scenario includes a predetermined reduced carbon scenario.

6. The system of claim 1, wherein the processor is further configured to perform an operation comprising:
adjusting the climate transition risk based on a predetermined carbon emission.

7. The system of claim 1, wherein the processor is further configured to perform an operation comprising:
constructing a portfolio based on the climate transition risk.

8. The system of claim 1, wherein the processor is further configured to perform an operation comprising:
backtesting the at least one HLM.

9. The system of claim 1, wherein the one or more securities include at least one of equities, fixed income and fixed income derivatives.

10. A computer-implemented method, the method comprising:
receiving, by a computing system comprising a processor and a memory, via at least one network, a user selection of a climate change scenario from a remote client device;
retrieving, over the at least one network, by the computing system, energy data from among one or more energy sources, the energy data comprising one or more of simulated future price data, supplier cost data and demand data for the one or more energy sources;
identifying, by the computing system, a predetermined number of energy factors according to a principal component analysis (PCA) of the retrieved energy data, based on a correlation of the predetermined number of energy factors with principal components among the retrieved energy data;
retrieving, by the computing system, over the at least one network, historical financial information directed to one or more securities from one or more remote financial data sources;
predicting, by the computing system, one or more future returns for the one or more securities, through a simulation of a climate change impact of the one or more energy sources, by applying the historical financial data and the predetermined number of energy factors to at least one hierarchical linear model (HLM), the at least one HLM configured to predict how the one or more remote financial data sources respond to multiple future climate scenarios based on measurable action data among the historical financial data, the measurable action data indicative of a responsiveness of the one or more remote financial data sources to current energy market data, thereby minimizing one or more self-reporting biases among the one or more remote financial data sources;
adjusting, by the computing system, the predicted one or more future returns based on a first climate scenario and the selected climate scenario, to form respective first adjusted returns and second adjusted returns;
generating, by the computing system, a climate transition risk for the one or more securities based on a spread between the first adjusted returns and the second adjusted returns, the climate transition risk is a metric based on a correlation between the one or more securities and climate sensitivity and indicates an amplitude and direction of the climate sensitivity on a given portfolio of investments including the one or more securities, the climate sensitivity indicating financial effects caused by a transition to the selected climate scenario on the given portfolio of investments including the one or more securities;
providing a data set representing the climate transition risk to the remote client device, the data set including one or more metrics for evaluation of the climate sensitivity of the given portfolio of investments;
responsive to the data set provided to the remote client device, receiving, by the processor, additional user input indicative of an adjustment of the climate sensitivity associated with the evaluation of the one or more metrics; and
adjusting, by the processor, the climate sensitivity by adjusting the one or more metrics provided to the remote client device, in accordance with the additional user input received.

11. The computer-implemented method of claim 10, the method further comprising:
converting, by the computing system, the energy data to energy return data, such that the energy return data is compatible with the one or more securities,
wherein the identifying further comprises identifying the predetermined number of energy factors from the energy return data.

12. The computer-implemented method of claim 11, wherein the predetermined number of energy factors are identified from the energy return data based on the principal component analysis.

13. The computer-implemented method of claim 10, the method further comprising:
training, by the computing system, the at least one HLM by regressing the historical financial information on the predetermined number of energy factors for at least one predefined past period.

14. The computer-implemented method of claim 10, wherein the first climate scenario includes a business as usual (BAU) scenario and the selected climate scenario includes a predetermined reduced carbon scenario.

15. The computer-implemented method of claim 10, the method further comprising:
adjusting, by the computing system, the climate transition risk based on a predetermined carbon emission.

16. The computer-implemented method of claim 10, the method further comprising:
constructing, by the computing system, a portfolio based on the climate transition risk.

17. The computer-implemented method of claim 10, the method further comprising:
backtesting, by the computing system, the at least one HLM.

18. The computer-implemented method of claim 10, wherein the one or more securities include at least one of equities, fixed income and fixed income derivatives.

19. A non-transitory computer readable medium having instructions stored thereon, which, when executed by a processor, cause the processor to perform an operation comprising:
receiving, via at least one network, a user selection of a climate change scenario from a remote client device;
retrieving, over the at least one network, energy data from among one or more energy sources, the energy data comprising one or more of simulated future price data, supplier cost data and demand data for the one or more energy sources;
identifying a predetermined number of energy factors according to a principal component analysis (PCA) of the retrieved energy data, based on a correlation of the predetermined number of energy factors with principal components among the retrieved energy data;

retrieving, over the at least one network, historical financial information directed to one or more securities from one or more remote financial data sources;

predicting one or more future returns for the one or more securities, through a simulation of a climate change impact of the one or more energy sources, by applying the historical financial data and the predetermined number of energy factors to at least one hierarchical linear model (HLM), the at least one HLM configured to predict how the one or more remote financial data sources respond to multiple future climate scenarios based on measurable action data among the historical financial data, the measurable action data indicative of a responsiveness of the one or more remote financial data sources to current energy market data, thereby minimizing one or more self-reporting biases among the one or more remote financial data sources;

adjusting the predicted one or more future returns based on a first climate scenario and the selected climate scenario, to form respective first adjusted returns and second adjusted returns;

generating a climate transition risk for the one or more securities based on a spread between the first adjusted returns and the second adjusted returns, the climate transition risk is a metric based on a correlation between the one or more securities and climate sensitivity and indicates an amplitude and direction of the climate sensitivity on a given portfolio of investments including the one or more securities, the climate sensitivity indicating financial effects caused by a transition to the selected climate scenario on the given portfolio of investments including the one or more securities;

providing a data set representing the climate transition risk to the remote client device, the data set including one or more metrics for evaluation of the climate sensitivity of the given portfolio of investments;

responsive to the data set provided to the remote client device, receiving, by the processor, additional user input indicative of an adjustment of the climate sensitivity associated with the evaluation of the one or more metrics; and adjusting, by the processor, the climate sensitivity by adjusting the one or more metrics provided to the remote client device, in accordance with the additional user input received.

20. The non-transitory computer readable medium of claim 19, wherein the operation further comprises:
converting the energy data to energy return data, such that the energy return data is compatible with the one or more securities,
wherein the identifying further comprises identifying the predetermined number of energy factors from the energy return data.

21. The non-transitory computer readable medium of claim 20, wherein the predetermined number of energy factors are identified from the energy return data based on the principal component analysis.

22. The non-transitory computer readable medium of claim 19, wherein the operation further comprises:
training the at least one HLM by regressing the historical financial information on the predetermined number of energy factors for at least one predefined past period.

23. The non-transitory computer readable medium of claim 19, wherein the first climate scenario includes a business as usual (BAU) scenario and the selected climate scenario includes a predetermined reduced carbon scenario.

24. The non-transitory computer readable medium of claim 19, wherein the operation further comprises:
adjusting the climate transition risk based on a predetermined carbon emission.

25. The non-transitory computer readable medium of claim 19, wherein the operation further comprises:
constructing a portfolio based on the climate transition risk.

26. The non-transitory computer readable medium of claim 19, wherein the operation further comprises:
backtesting the at least one HLM.

27. The non-transitory computer readable medium of claim 19, wherein the one or more securities include at least one of equities, fixed income and fixed income derivatives.

* * * * *

UNITED STATES PATENT AND TRADEMARK OFFICE
CERTIFICATE OF CORRECTION

PATENT NO. : 11,694,269 B2
APPLICATION NO. : 17/550421
DATED : July 4, 2023
INVENTOR(S) : Stoner, Jr. et al.

It is certified that error appears in the above-identified patent and that said Letters Patent is hereby corrected as shown below:

In the Claims

At Column 38, bridging Lines 1 and 2 and Lines 59 and 60, In Claim 1, please change "historical financial information" to --historical financial data--;

At Column 39, Line 33, In Claim 10, please change "historical financial information" to --historical financial data--;

At Column 40, Line 29, In Claim 13, please change "historical financial information" to --historical financial data--;

At Column 41, bridging Lines 1 and 2, In Claim 19, please change "historical financial information" to --historical financial data--; and At Column 42, bridging Lines 19 and 20, In Claim 22, please change "historical financial information" to --historical financial data--.

Signed and Sealed this
Twenty-ninth Day of August, 2023

Katherine Kelly Vidal
*Director of the United States Patent and Trademark Office*